US008984836B2

(12) United States Patent
Valentine

(10) Patent No.: US 8,984,836 B2
(45) Date of Patent: Mar. 24, 2015

(54) SYNTHETIC THATCH MEMBERS FOR USE AS ROOFING MATERIAL PRODUCTS AND METHODS OF MAKING AND USING THE SAME

(71) Applicant: Doc Palapa Co., Gainesville, GA (US)

(72) Inventor: David Michael Valentine, Gainesville, GA (US)

(73) Assignee: Doc Palapa Co., Gainesville, GA (US)

( * ) Notice: Subject to any disclaimer, the term of this patent is extended or adjusted under 35 U.S.C. 154(b) by 180 days.

(21) Appl. No.: 13/779,500

(22) Filed: Feb. 27, 2013

(65) Prior Publication Data

US 2013/0255173 A1 Oct. 3, 2013

Related U.S. Application Data

(60) Provisional application No. 61/616,617, filed on Mar. 28, 2012.

(51) Int. Cl.
| | |
|---|---|
| *E04D 9/00* | (2006.01) |
| *E04D 5/06* | (2006.01) |
| *B29C 45/00* | (2006.01) |
| *B29C 47/00* | (2006.01) |

(52) U.S. Cl.
CPC .. *E04D 9/00* (2013.01); *E04D 5/06* (2013.01); *B29C 45/00* (2013.01); *B29C 47/00* (2013.01)
USPC ............................................ 52/555; 52/748.1

(58) Field of Classification Search
CPC ............ E04D 9/00; E04D 45/00; E04D 47/00
USPC ................... 428/17, 27, 99; 52/555, 748.1
See application file for complete search history.

(56) References Cited

U.S. PATENT DOCUMENTS

| | | | | |
|---|---|---|---|---|
| 4,611,451 | A * | 9/1986 | Symbold | 52/555 |
| 5,333,431 | A | 8/1994 | Houpt | |
| 7,117,652 | B2 * | 10/2006 | Huber et al. | 52/750 |
| 2005/0235580 | A1 | 10/2005 | Golden | |

OTHER PUBLICATIONS

Tikitouch.Info, "Use Palmex Brand Artificial Tiki Leaves for Your Tikihut or Bar," May 29, 2009 to May 29, 2009, Internet Archive <http://web.archive.org/web/20090529213914/http://tikitouch.info/>, 2 pages, retrieved Feb. 27, 2013.

(Continued)

*Primary Examiner* — Alexander Thomas
(74) *Attorney, Agent, or Firm* — Alston & Bird LLP

(57) ABSTRACT

A synthetic thatch member for use as a roofing material product, along with associated methods for manufacturing and installing the same are provided. The synthetic thatch member comprises: a plurality of frond members defining a first three-dimensional surface of the thatch member and a second three-dimensional surface of the thatch member, the first and second surfaces comprising opposing sides of the plurality of frond members; a fused portion comprising a first portion of each of the plurality of frond members, wherein each of the first portions is connected relative to one another, such that the fused portion defines a substantially impermeable surface; and a serrated portion comprising a second portion of each of the plurality of frond members, each of the second portions being separated relative to one another, such that a plurality of gaps are defined between each of the plurality of frond members.

28 Claims, 23 Drawing Sheets

(56) References Cited

OTHER PUBLICATIONS

Doubleyourincome, "Tiki Hut Palm Grass is where you want to be!," *YouTube*, <http://www.youtube.com/watch?v=wKxayqs-4CM>, Mar. 27, 2009.

International Searching Authority, International Search Report and Written Opinion for International Application No. PCT/US2013/027923, mailed May 22, 2013, 10 pages, European Patent Office, The Netherlands.

\* cited by examiner

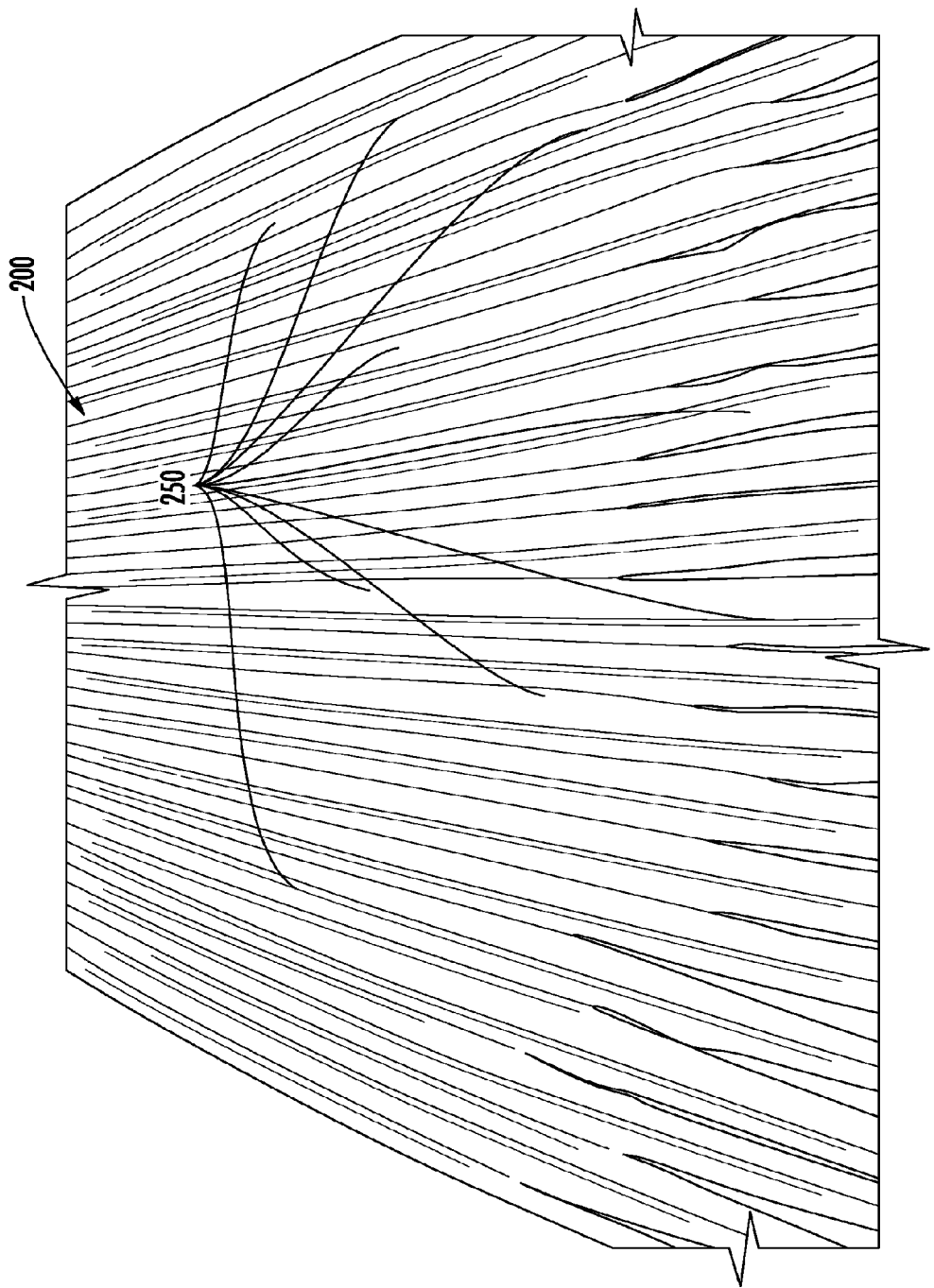

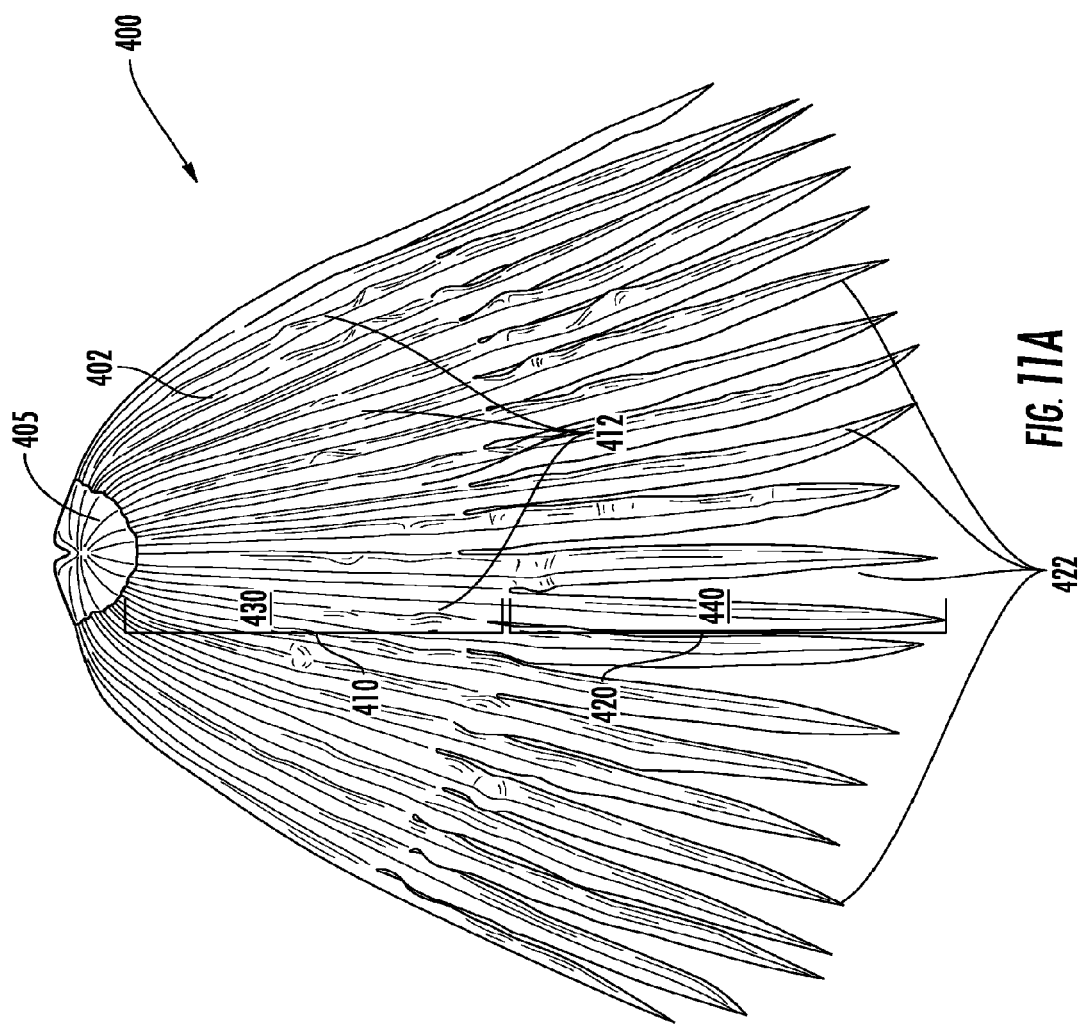

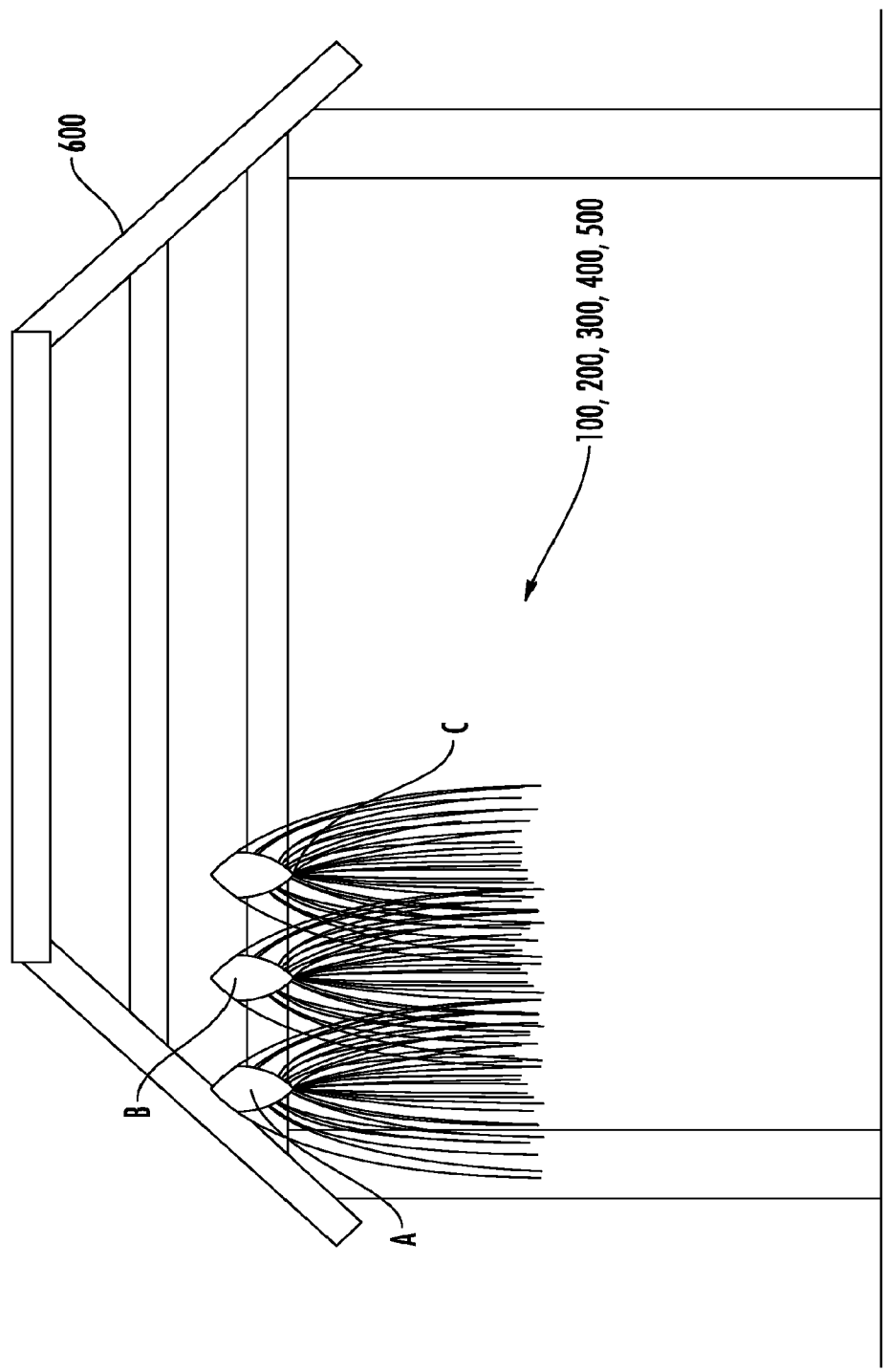

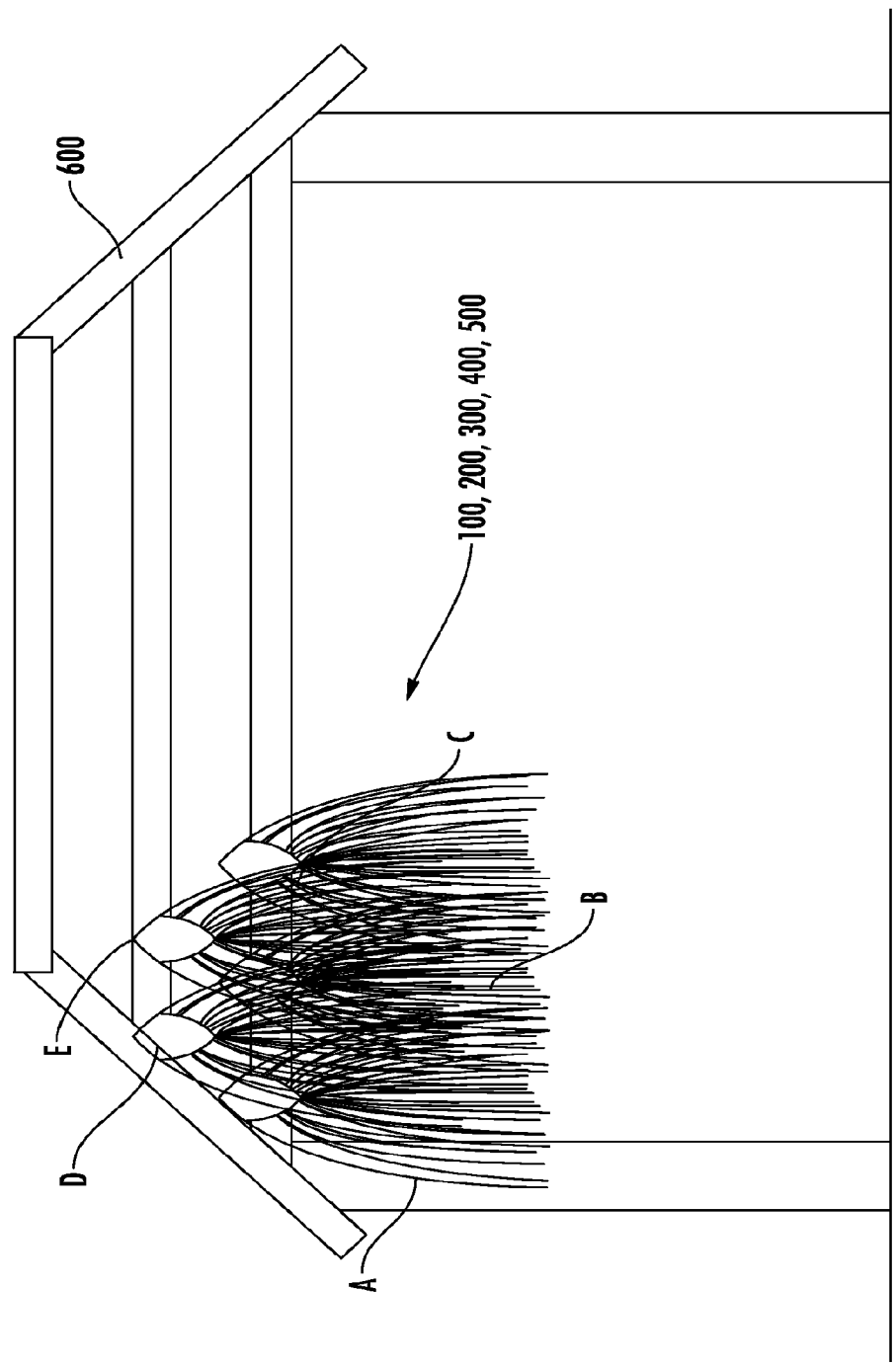

SYNTHETIC THATCH MEMBERS FOR USE AS ROOFING MATERIAL PRODUCTS AND METHODS OF MAKING AND USING THE SAME

CROSS-REFERENCE TO RELATED APPLICATIONS

This application claims priority to and the benefit of U.S. Provisional Patent Application Ser. No. 61/616,617, entitled "Synthetic Thatch Members for Use as Roofing Material Products and Methods of Making the Same," filed Mar. 28, 2012, the contents of which are hereby incorporated by reference in its entirety.

BACKGROUND

1. Technical Field

Embodiments of the present invention relate generally to synthetic thatch elements, and more particularly to synthetic thatch elements resembling palm fronds and configured for use as roofing material products.

2. Description of Related Art

Thatch elements, such of the type illustrated as (20) in FIG. 1 herein, are often used as decorative or roofing material products. Natural thatch elements, however, tend to be flammable and are degraded rapidly by natural conditions, such as sunlight, heat, mold, water, and fungi. As a result, the commercial viability of natural thatch elements as roofing material products is minimal, if not non-existent.

In response to the above-described concerns with natural thatch elements, a variety of synthetic thatch elements, made from polymers or other materials, have been designed to have increased environmental stability. Such synthetic thatch elements, an example of which may be seen as (10) in FIG. 1, are generally formed from an elongate, oftentimes rectangular, polymer strip having first and second side surfaces, with one of the side surfaces having a texture element. While the synthetic elements, in this manner, generally address the above-described environmentally-created concerns with natural thatch elements, they never fully replicate the "natural" appearance, which is a very desirable characteristic for maximizing commercial viability.

For example, the synthetic polymer strips, whether rectangular or elongate in shape, oftentimes do resemble the shape and structure of a natural thatch element, such as a palm frond. Still further, the synthetic polymer strips, as mentioned, generally have only a single textured surface, whether for cost or other considerations, resulting in an unattractive lower side surface. While in certain applications an un-textured (e.g., smooth, unnatural) undersurface may not prove problematic, if the synthetic thatch element is installed on an open-beam structure, such as a Tiki hut, the lack of "natural appearance" from underneath can be as problematic as having the same appearance from above. Accordingly, there is a need for durable, naturally shaped synthetic thatch elements that have a two-side natural appearance when used as decorative or roofing material products.

BRIEF SUMMARY

According to various embodiments of the present invention a synthetic thatch member for use as a roofing material product is provided. The synthetic thatch member comprises: a plurality of frond members, the frond members defining a first three-dimensional surface of the thatch member and a second three-dimensional surface of the thatch member, the first and second surfaces comprising opposing sides of the plurality of frond members; a fused portion, the fused portion comprising a first portion of each of the plurality of frond members, wherein each of the first portions is connected relative to one another, such that the fused portion defines a substantially impermeable surface; and a serrated portion, the serrated portion being located substantially adjacent the fused portion and comprising a second portion of each of the plurality of frond members, wherein each of the second portions is separated relative to one another, such that a plurality of gaps are defined between each of the second portions of each of the plurality of frond members.

In certain embodiments, each of the plurality of frond members comprises a pair of angled surfaces, the pair of angled surfaces being oriented relative to one another so as to define both the first and the second three-dimensional surfaces of the thatch member. In at least one embodiment, the pair of angled surfaces define a ridge portion on each of the plurality of frond members, and the pair of angled surfaces define at least one valley portion adjacent at least one edge of each of the plurality of frond members. In this manner, in the fused portion, the at least one valley portion is configured to, at least in part, define the substantially impermeable surface. Similarly, in the serrated portion, the at least one valley portion is configured to, at least in part, define the plurality of gaps.

According to various embodiments of the present invention a method of installing a synthetic thatch member as a roofing material product is provided. The method of installation first comprises the step of: (A) providing a plurality of synthetic thatch members, each member comprising: (i) a plurality of frond members, the frond members defining a first three-dimensional surface of the thatch member and a second three-dimensional surface of the thatch member, the first and second surfaces comprising opposing sides of the plurality of frond members; (ii) a fused portion, the fused portion comprising a first portion of each of the plurality of frond members, wherein each of the first portions is connected relative to one another, such that the fused portion defines a substantially impermeable surface; and (iii) a serrated portion, the serrated portion being located substantially adjacent the fused portion and comprising a second portion of each of the plurality of frond members, wherein each of the second portions is separated relative to one another, such that a plurality of gaps are defined between each of the second portions of each of the plurality of frond members.

The method then further comprises the steps of: (B) affixing a first one of the plurality of synthetic thatch members to an adjacently positioned portion of a roofing structure, such that the serrated portion is oriented substantially below the fused portion; and (C) affixing a second one of the plurality of synthetic thatch members to an adjacently positioned portion of the roofing structure, such that the first and second ones of the plurality of synthetic thatch members are both positioned substantially along the same horizontal plane, and such that at least a portion of the fused portion of the second one of the plurality of synthetic thatch members at least partially overlaps at least a portion of the fused portion of the first one of the plurality of synthetic thatch members.

In certain embodiments, the method still further comprises the step of affixing a third one of the plurality of synthetic thatch members to an adjacently positioned portion of the roofing structure, such that at least a portion of the fused portion of the third one of the plurality of synthetic thatch members is positioned substantially above the first and the second ones of the plurality of synthetic thatch members, such that at least a portion of the fused portion of the third one of the plurality of synthetic thatch members at least partially overlaps both (i) at least a portion of the fused portion of the first one of the plurality of synthetic thatch members; and (ii) at least a portion of the fused portion of the second one of the plurality of synthetic thatch members.

According to various embodiments of the present invention a method of manufacturing a synthetic thatch member for use as a roofing material product is provided. The method of manufacturing comprises the steps of: placing a molten polymer material into a mold; an forming the synthetic thatch member from the molten polymer material, wherein the synthetic thatch member comprises: (i) a plurality of frond members, the frond members defining a first three-dimensional surface of the thatch member and a second three-dimensional surface of the thatch member, the first and second surfaces comprising opposing sides of the plurality of frond members; (ii) a fused portion, the fused portion comprising a first portion of each of the plurality of frond members, wherein each of the first portions is connected relative to one another, such that the fused portion defines a substantially impermeable surface; and (iii) a serrated portion, the serrated portion being located substantially adjacent the fused portion and comprising a second portion of each of the plurality of frond members, wherein each of the second portions is separated relative to one another, such that a plurality of gaps are defined between each of the second portions of each of the plurality of frond members; and the mold defines the structural configuration of at least the plurality of frond members, the fused portion, and the serrated portion.

BRIEF DESCRIPTION OF THE SEVERAL VIEWS OF THE DRAWING(S)

The accompanying drawings incorporated herein and forming a part of the disclosure illustrate several aspects of the present invention and together with the detailed description serve to explain certain principles of the present invention. In the drawings, which are not necessarily drawn to scale:

Figure 2:
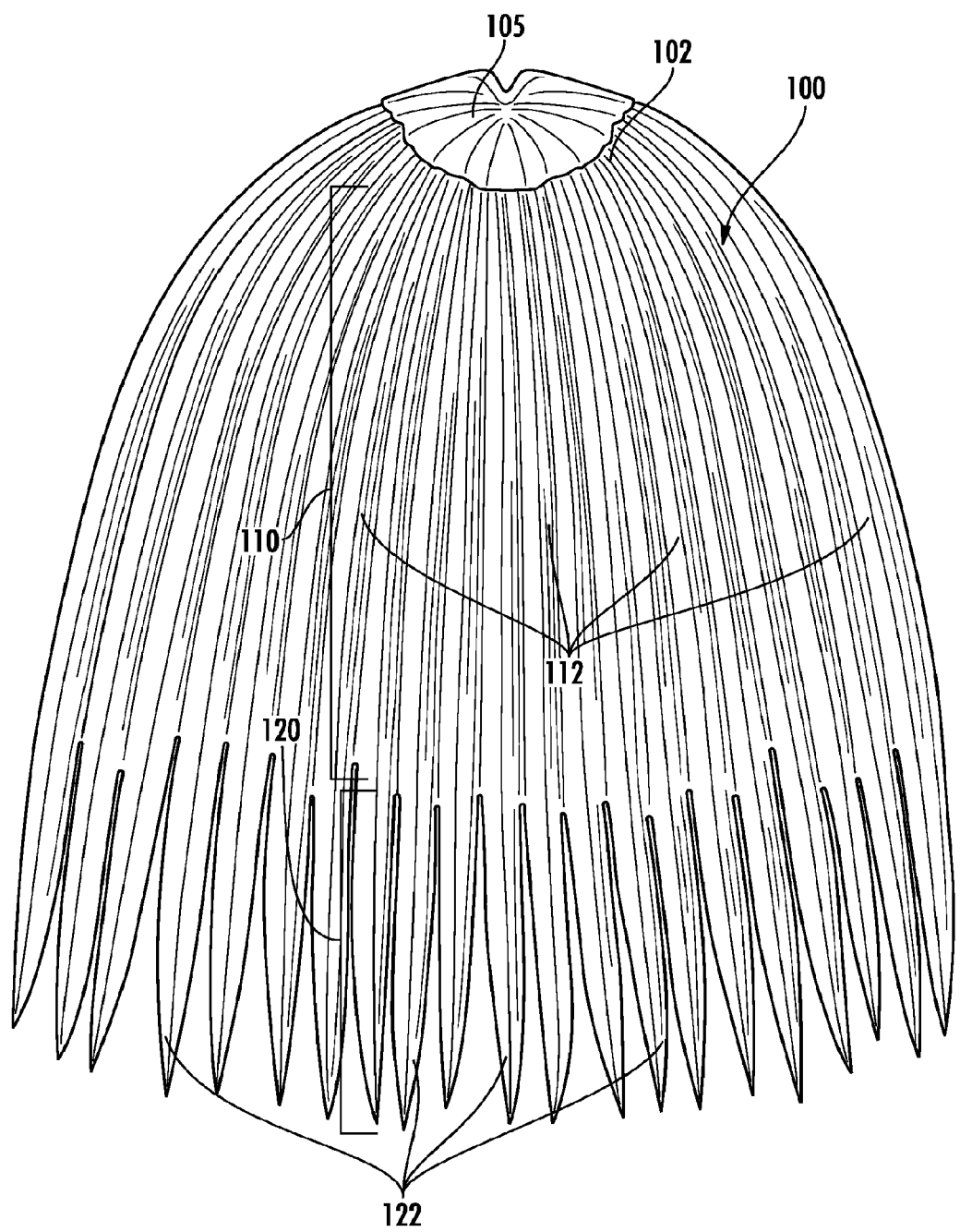
FIG. 2 is a top view of a first surface 102 of a synthetic thatch element 100 in accordance with various embodiments.
Figure 3:
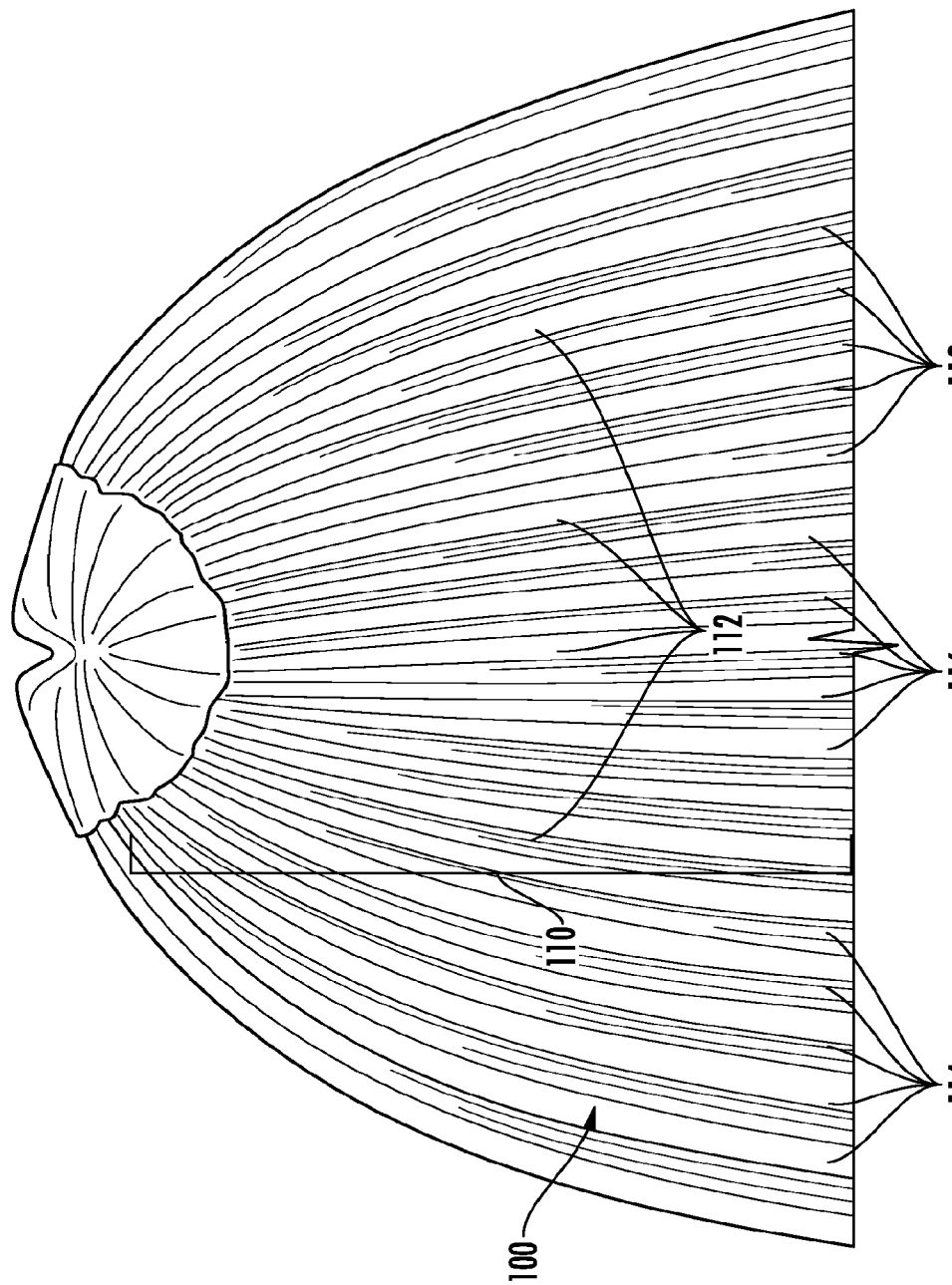
Figure 4:
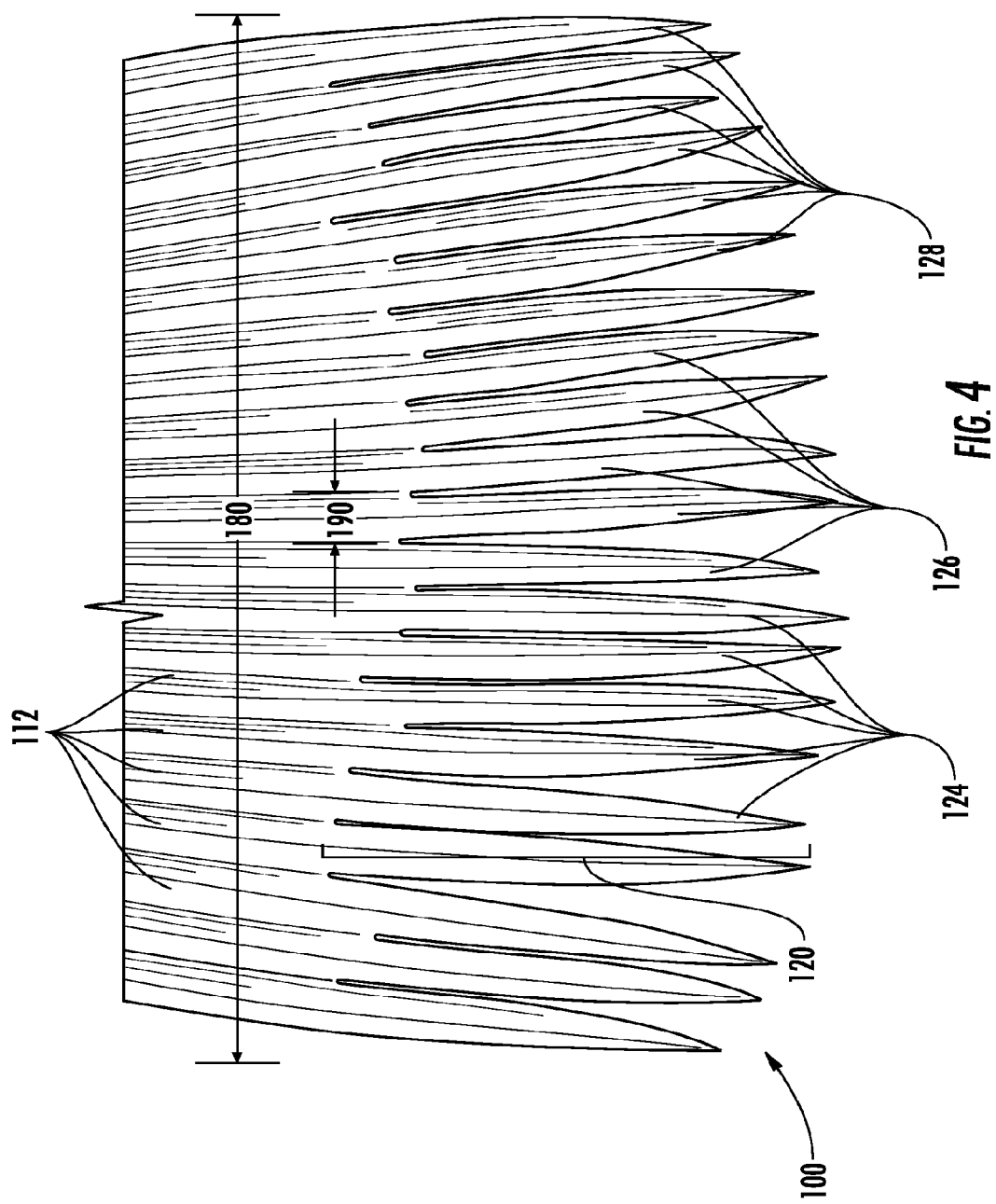
Figure 5:
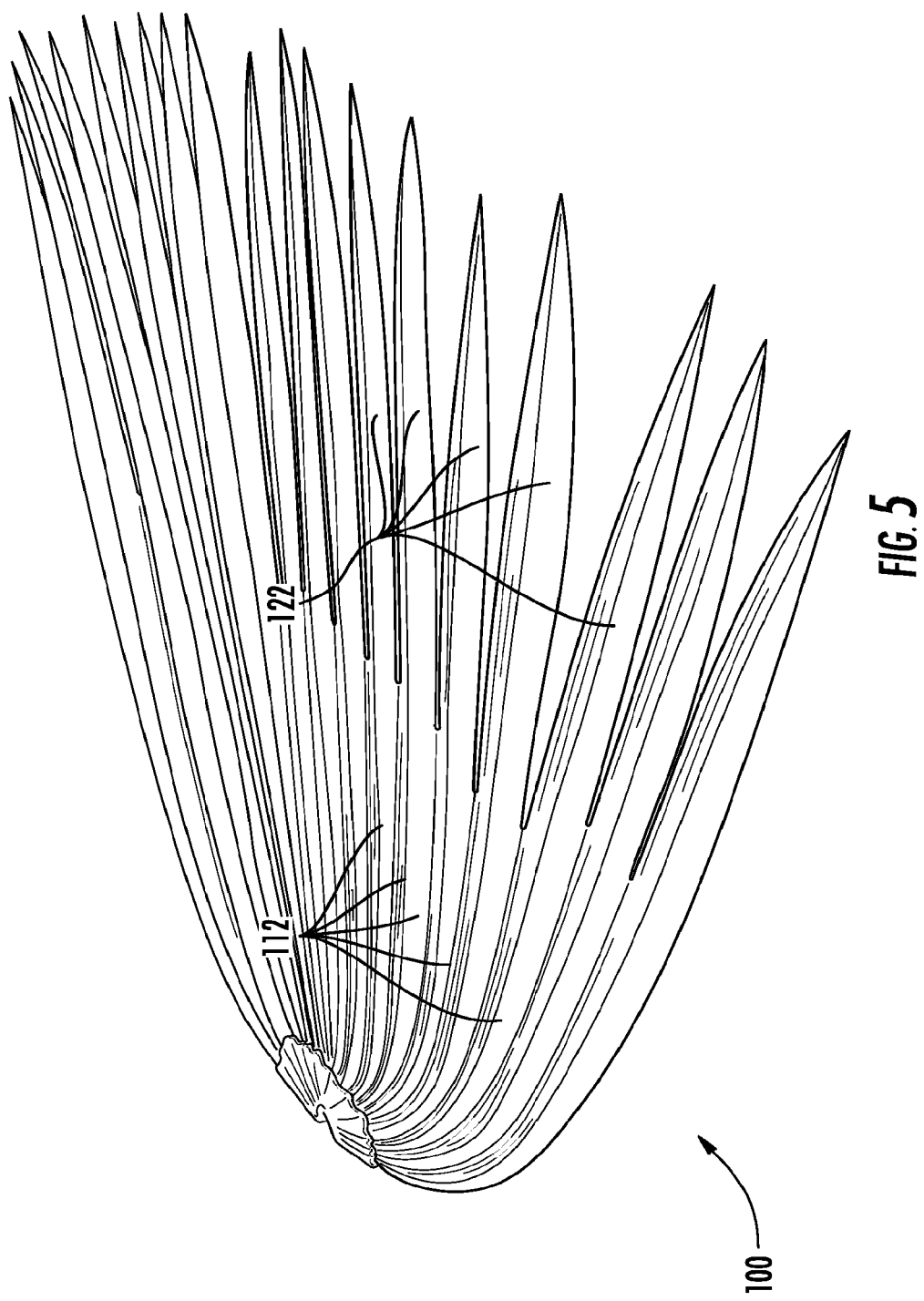
Figure 6:
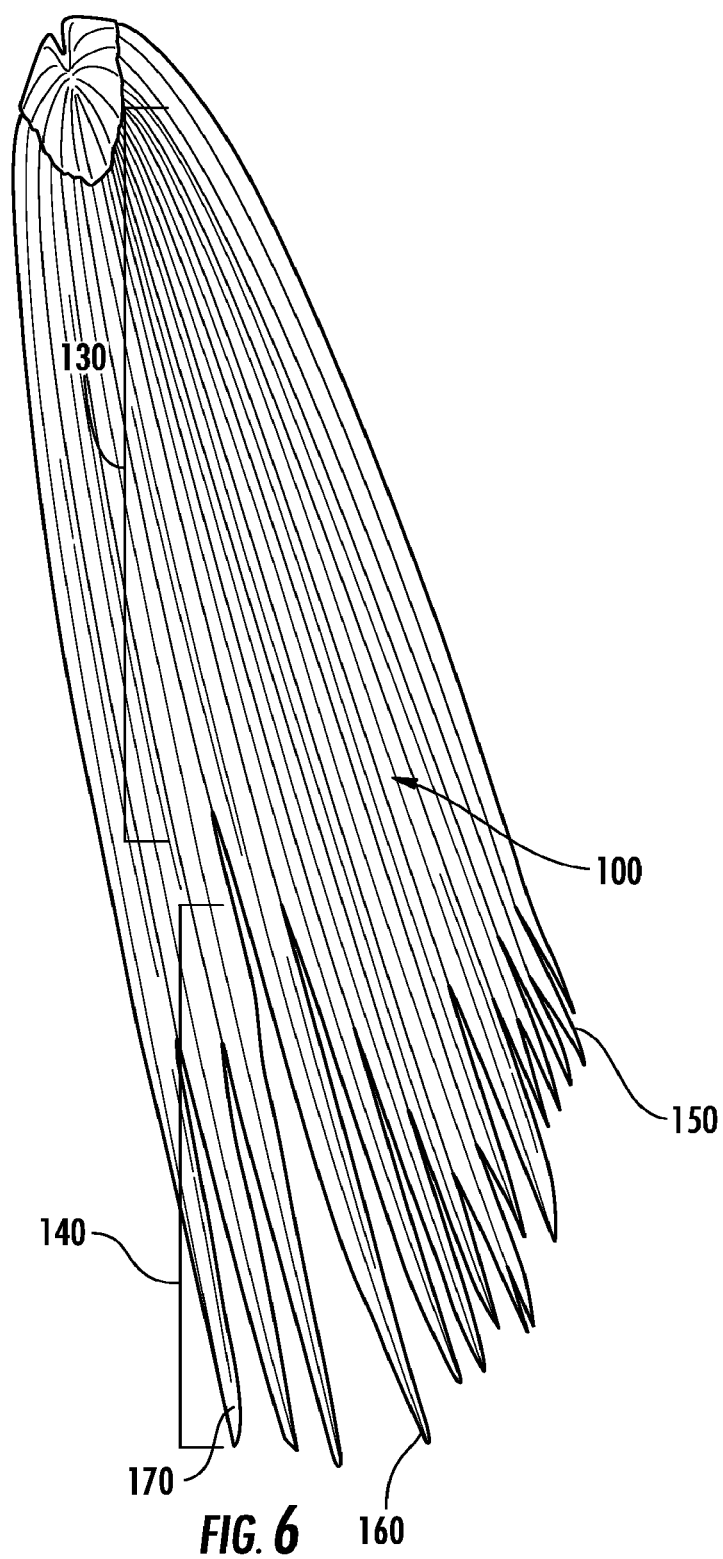
Figure 7:
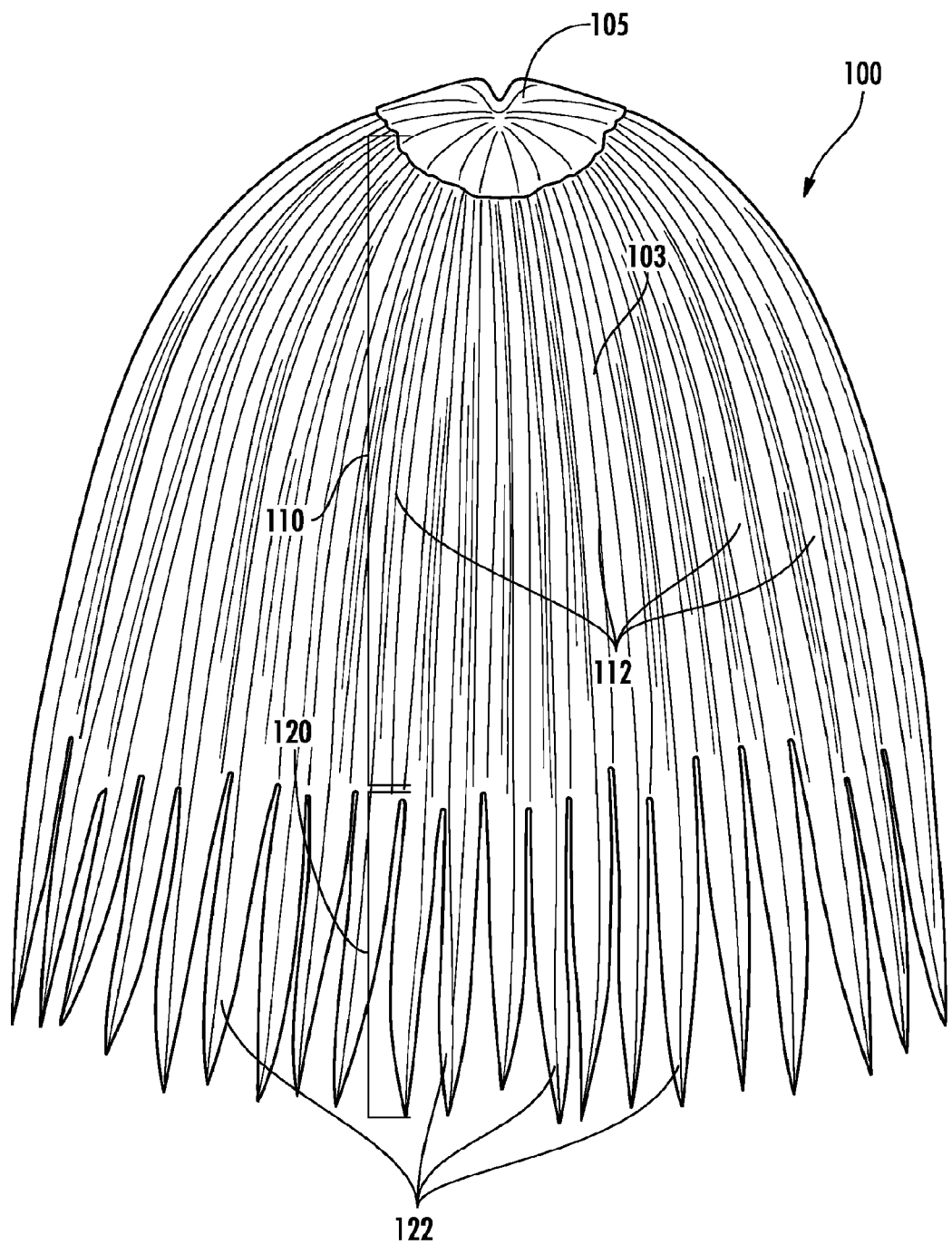
Figure 8:
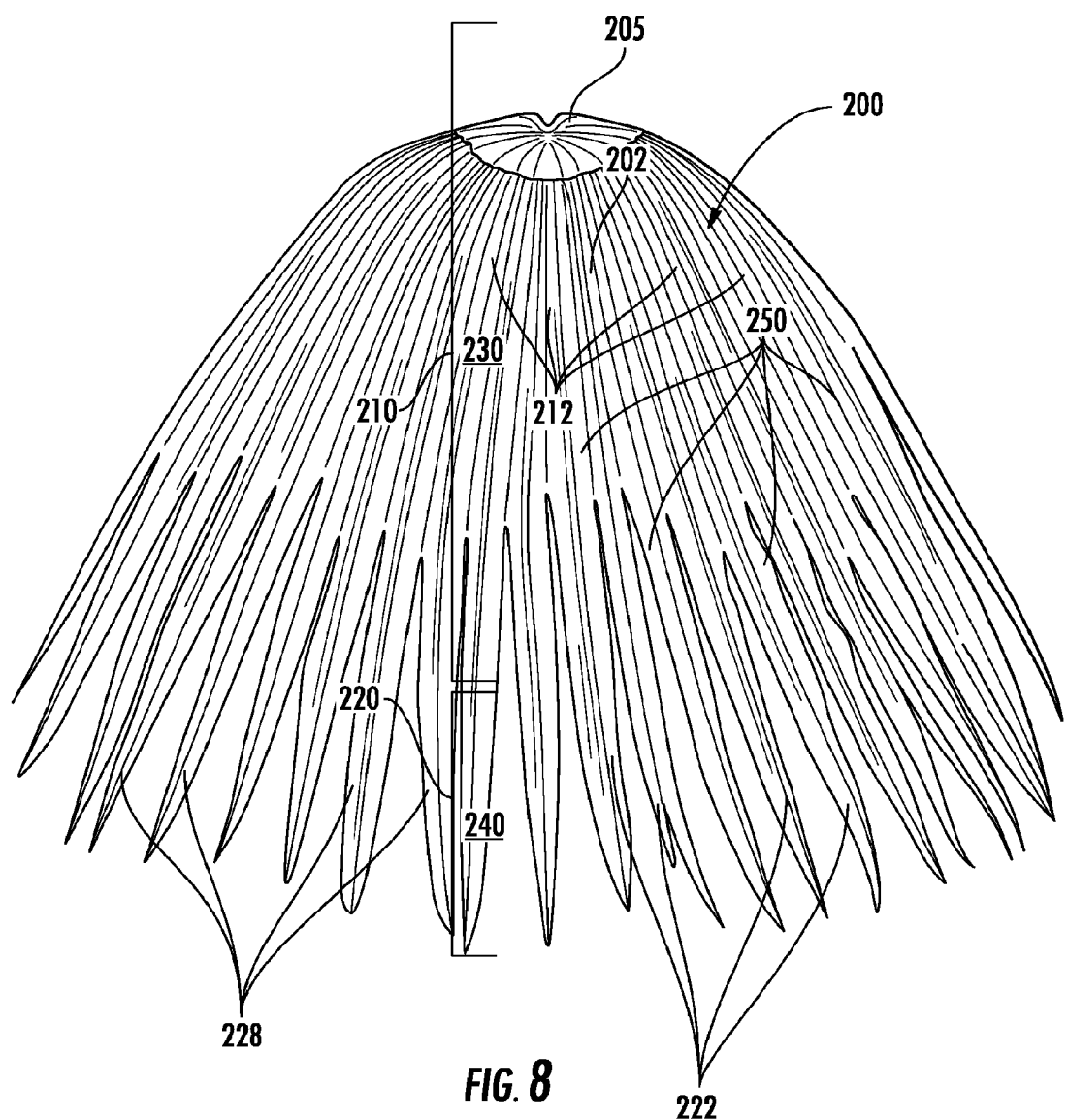
Figure 10A:
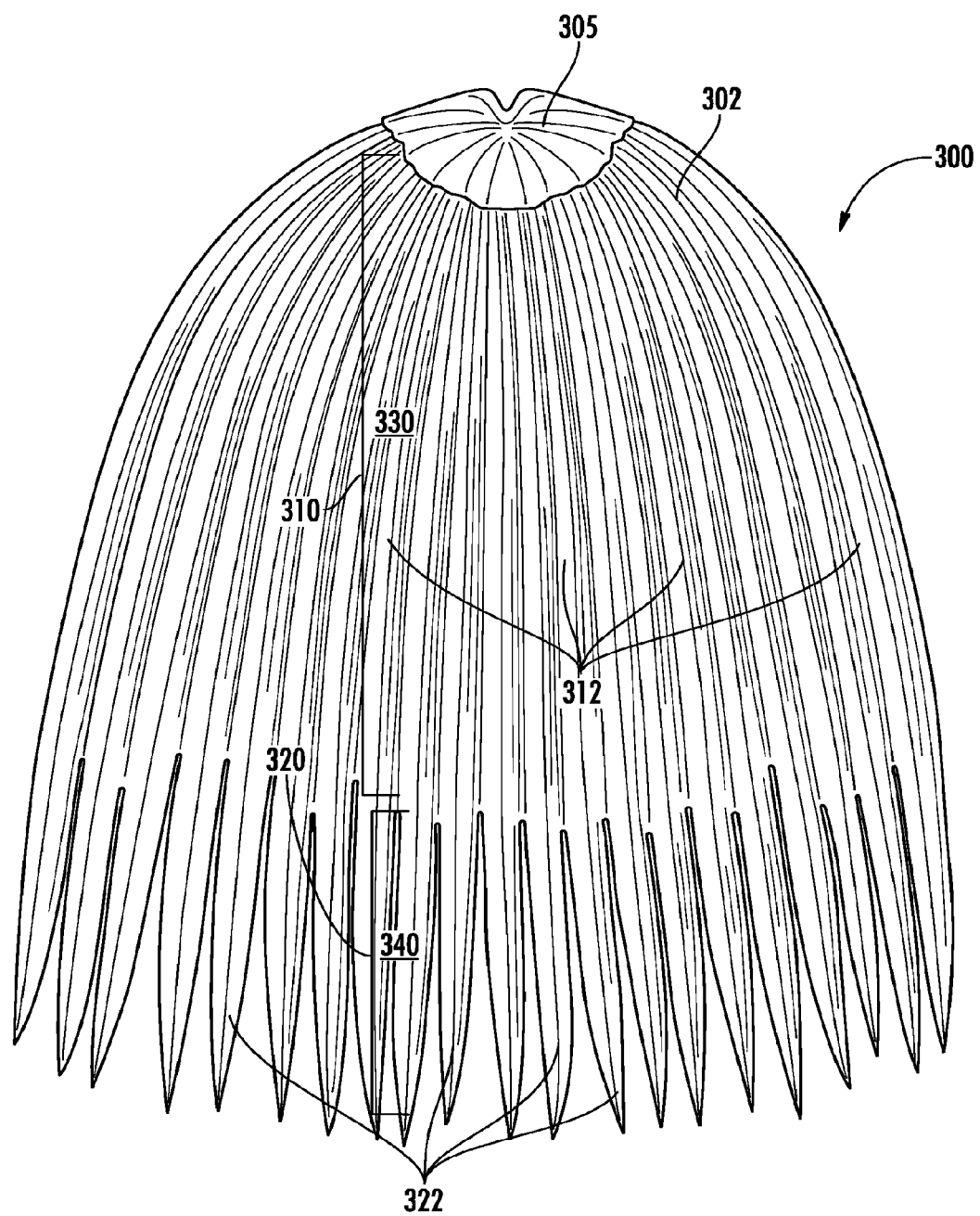
Figure 10B:
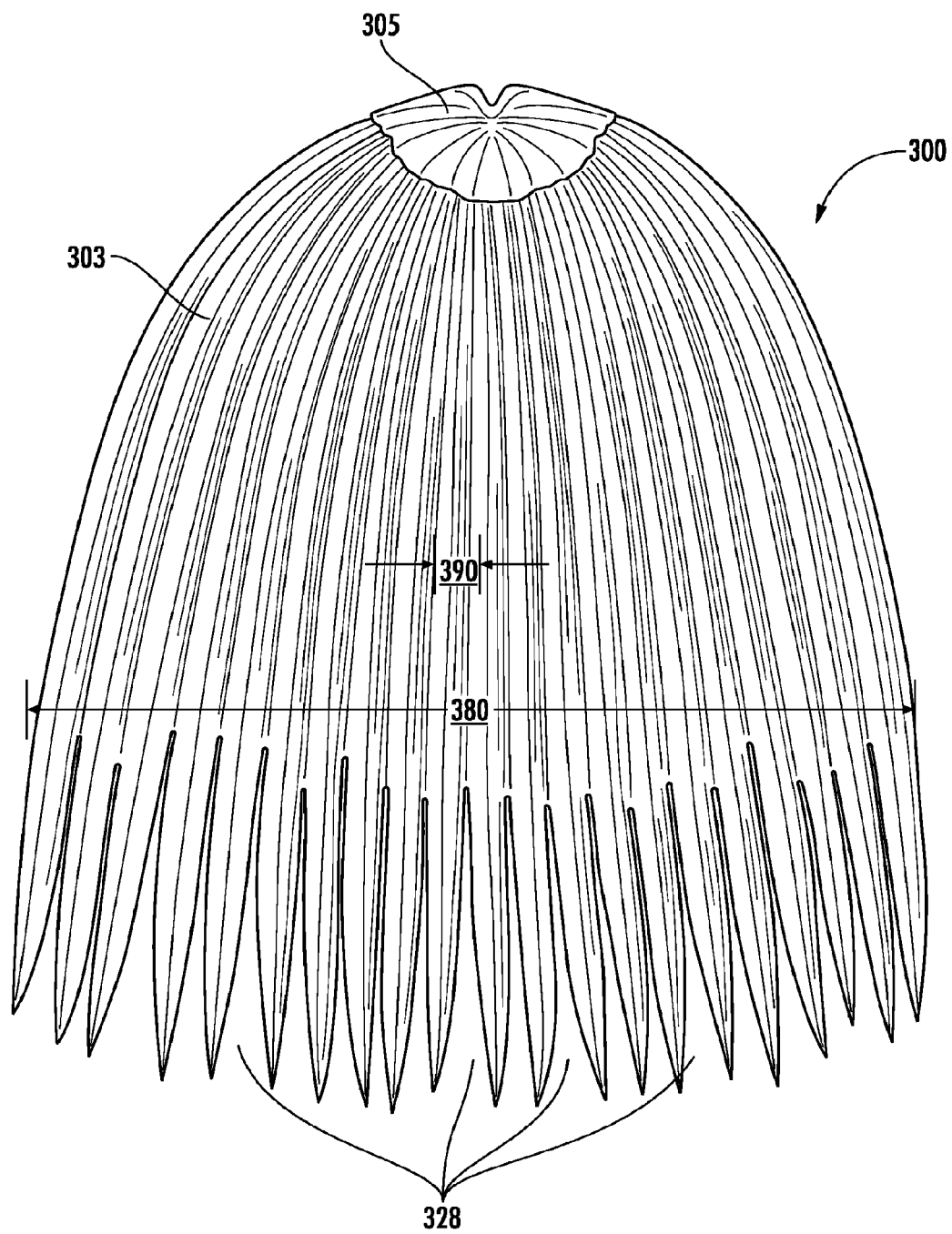
Figure 10C:
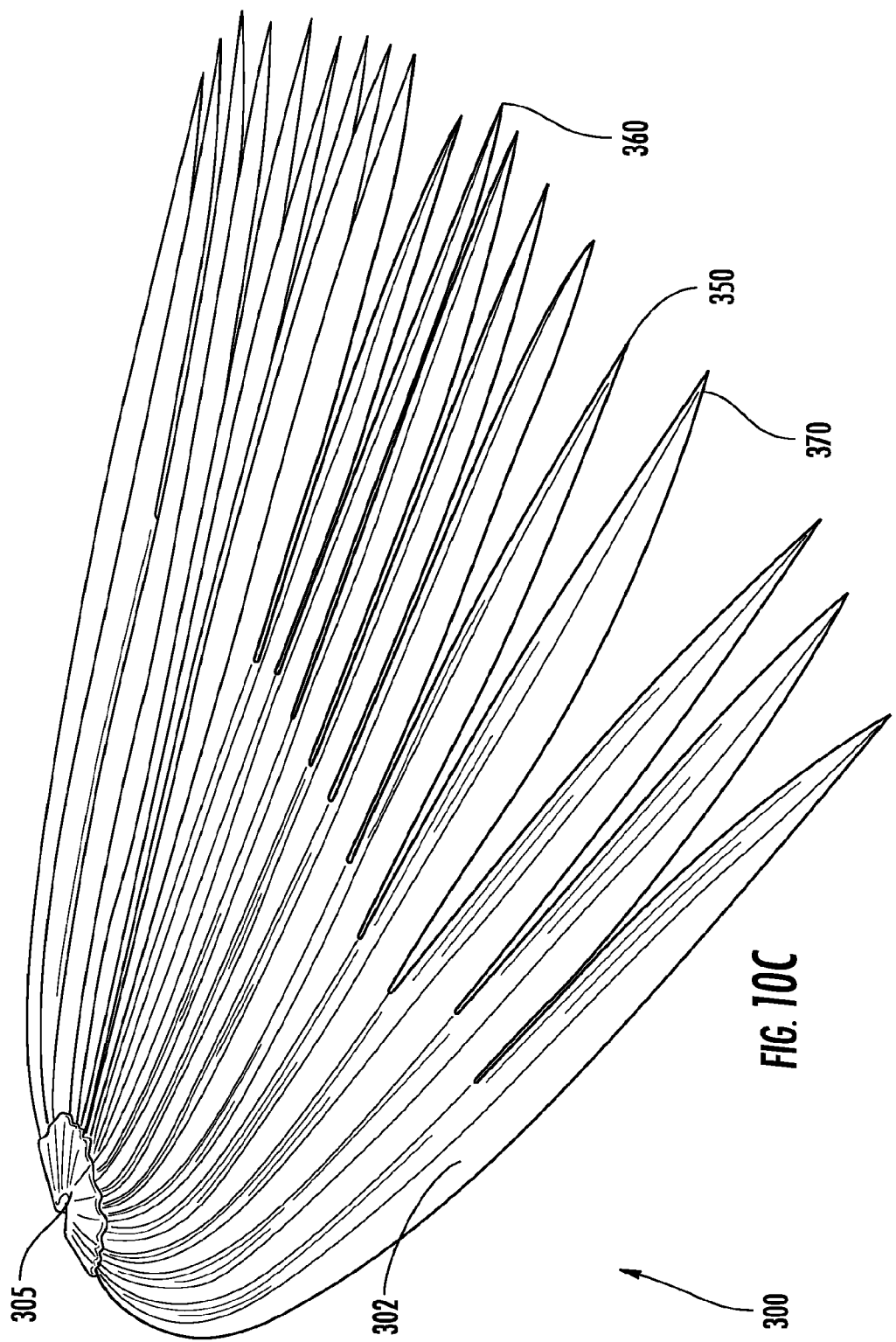
Figure 10D:
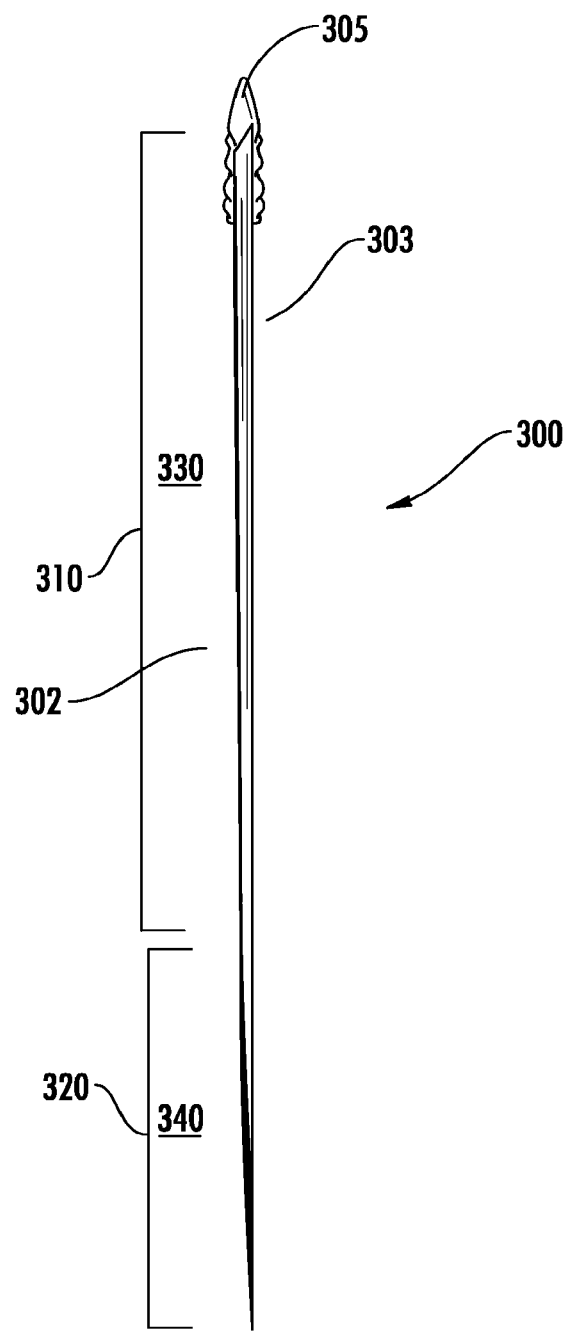
Figure 11B:
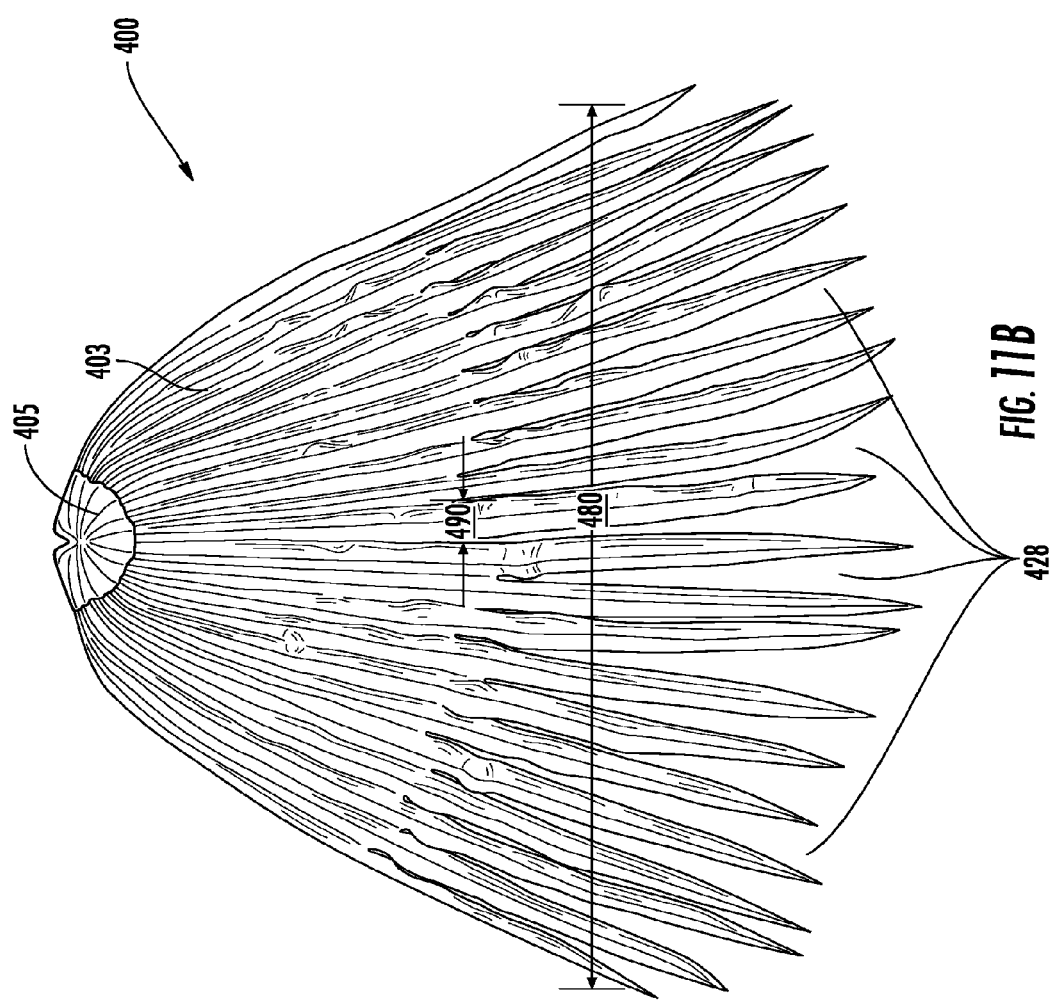
Figure 11C:
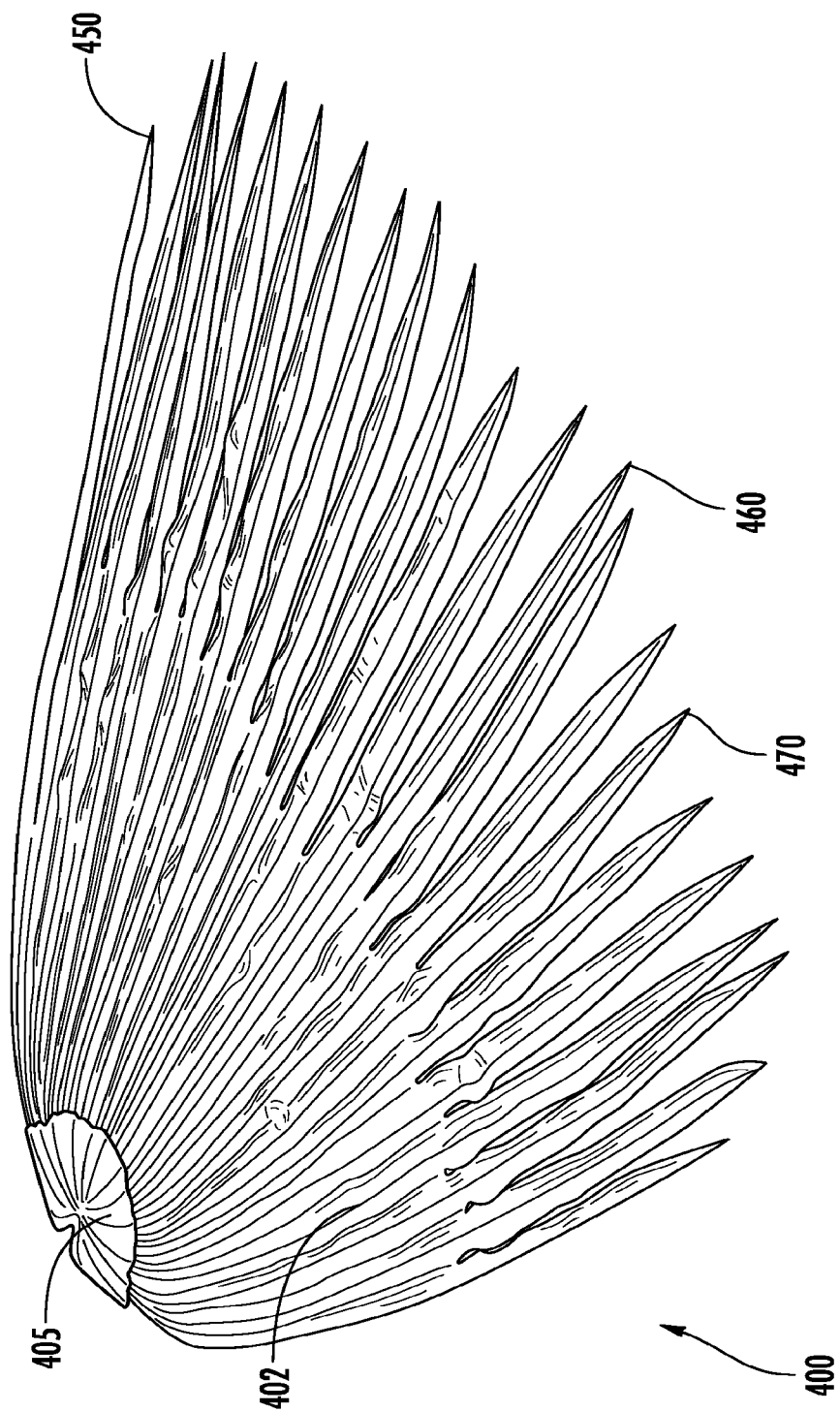
Figure 11D:
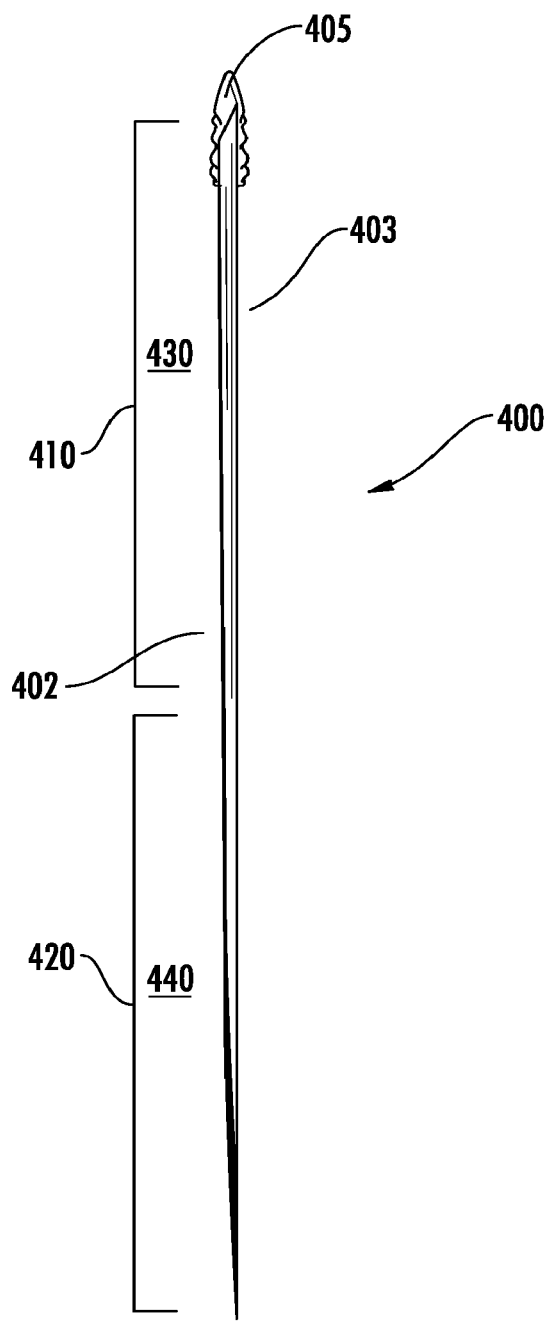
Figure 12A:
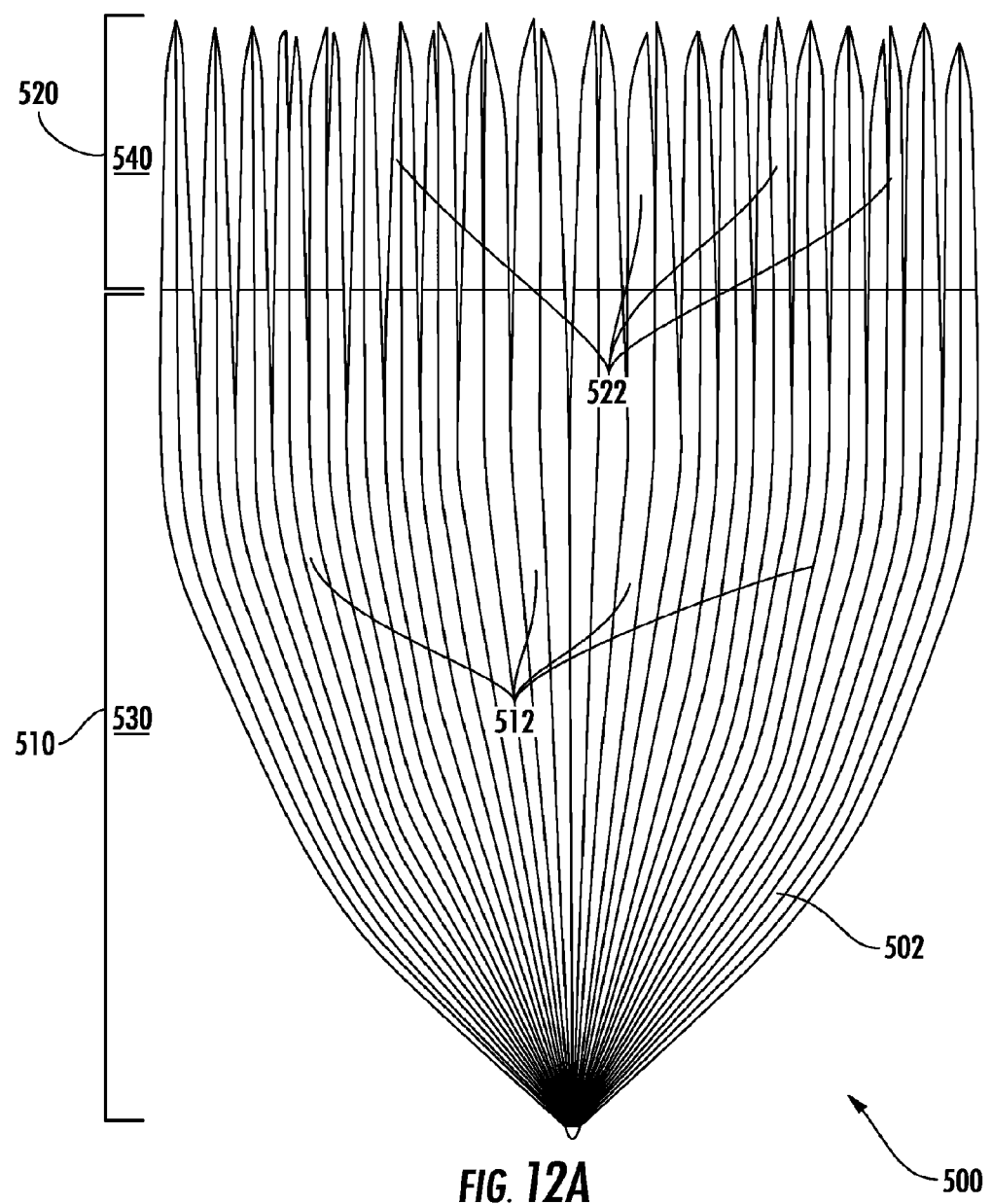
Figure 12B:
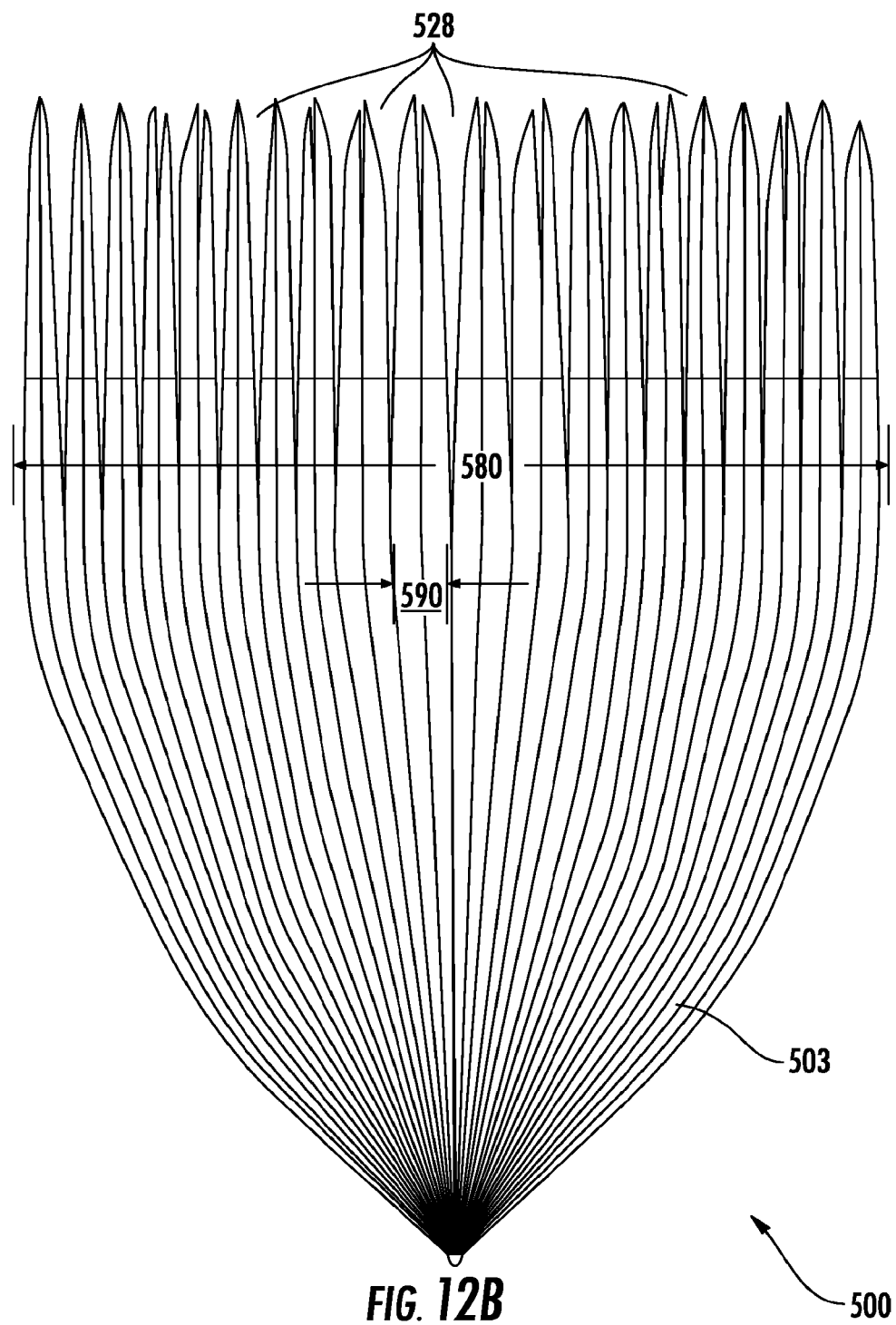
Figure 12C:
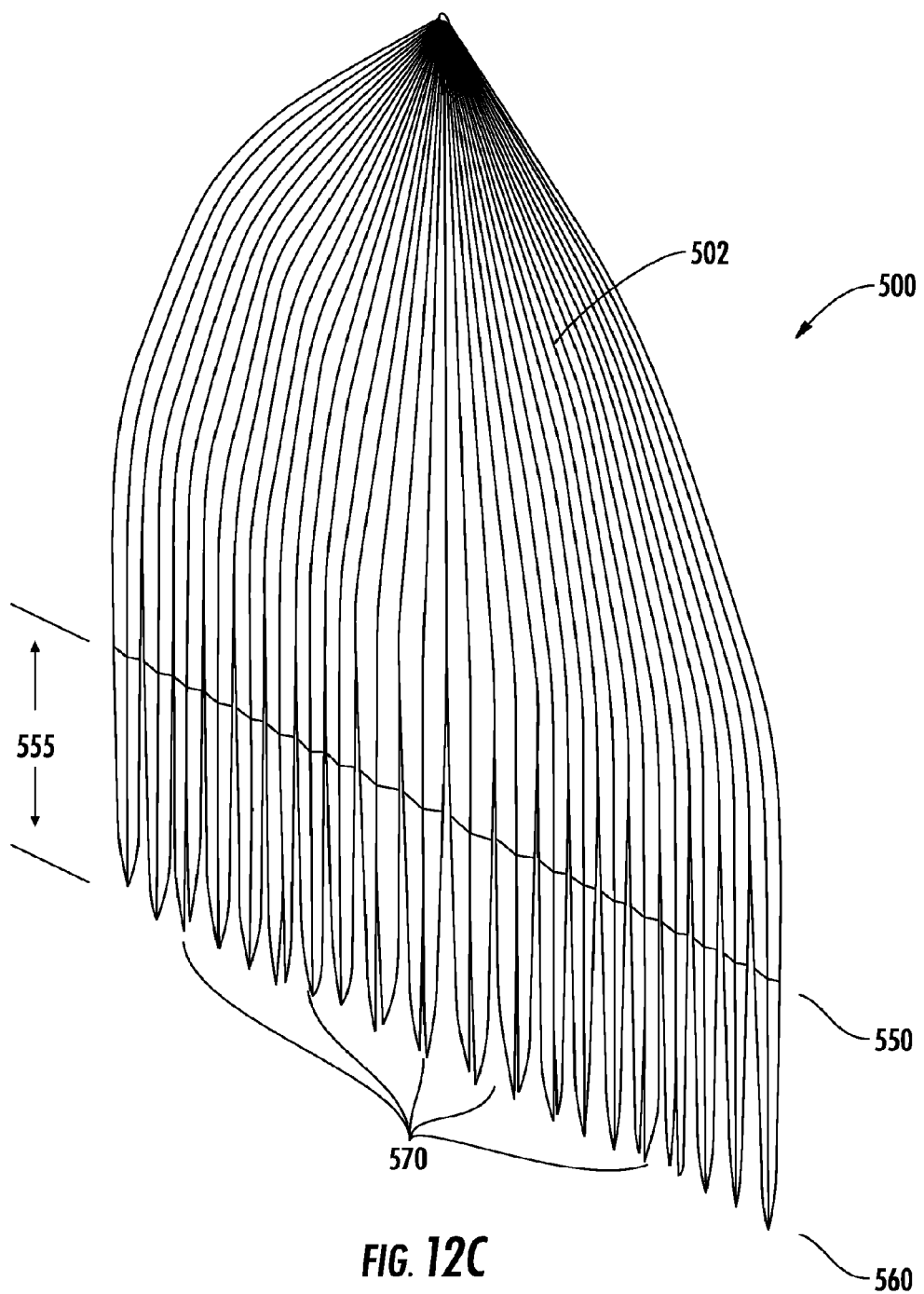
Figure 15:
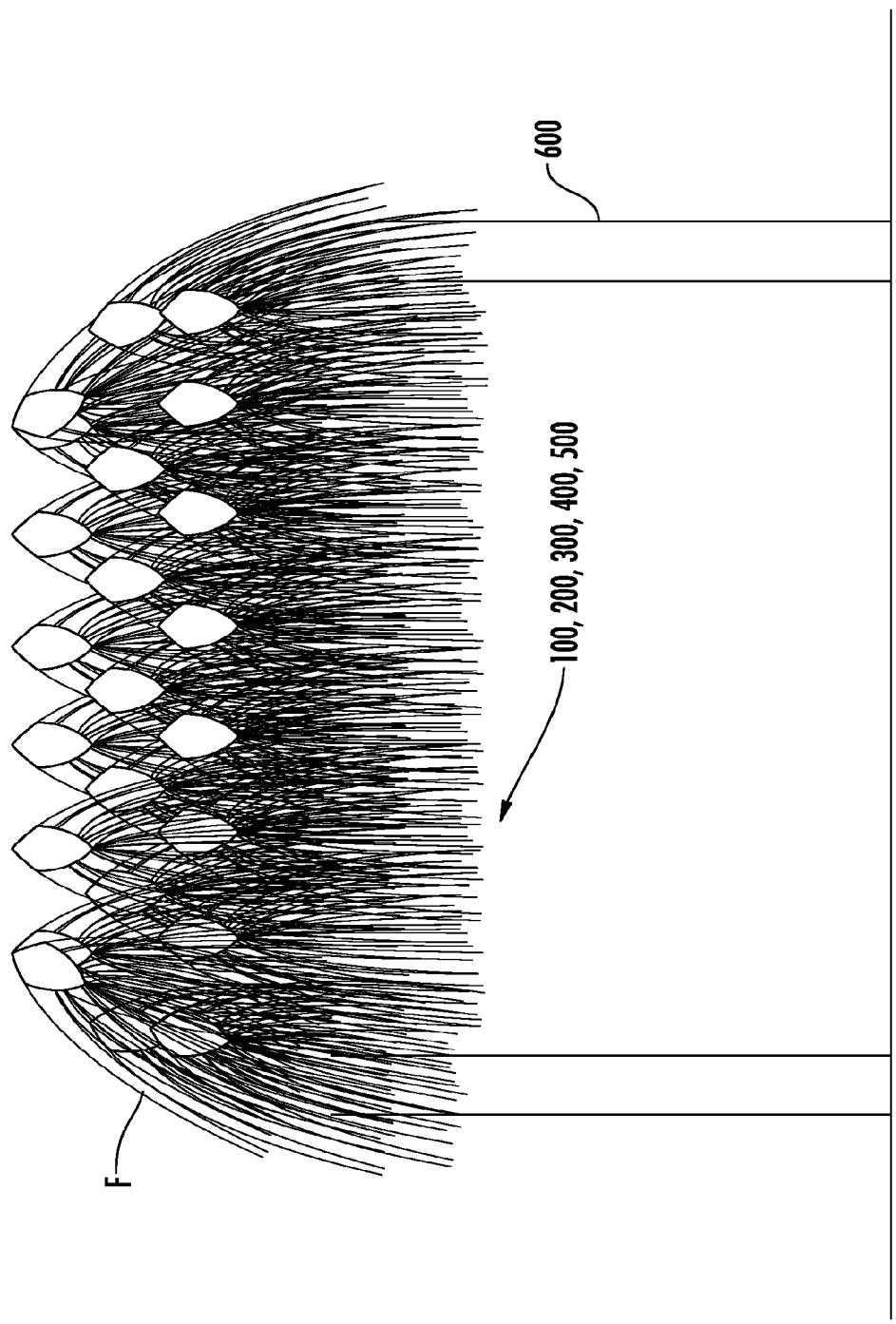

FIG. 3 is a detailed top view of a fused portion 110 of the first surface 102 of the synthetic thatch element 100 of FIG. 2;

FIG. 4 is a detailed top view of a serrated portion 120 of the first surface 102 of the synthetic thatch element 100 of FIG. 2;

FIG. 5 is a top perspective view of the first surface 102 of the synthetic thatch element 100 of FIG. 2;

FIG. 6 is another top perspective view of the first surface 102 of the synthetic thatch element 100 of FIG. 2;

FIG. 7 is a bottom view of the synthetic thatch element 100 of FIG. 2, illustrating a second surface 103;

FIG. 8 is a top view of a first surface 202 of a synthetic thatch element 200 in accordance with various embodiments;

FIG. 9 is a detailed top view of the synthetic thatch element 200 of FIG. 8;

FIG. 10A is top view of a first surface 302 of a synthetic thatch element 300 in accordance with various embodiments;

FIG. 10B is a bottom view of the synthetic thatch element 300 of FIG. 10A, illustrating a second surface 303;

FIG. 10C is a top perspective view of the first surface 302 of the synthetic thatch element 300 of FIG. 10A;

FIG. 10D is a side view of the synthetic thatch element 300 of FIG. 10A;

FIG. 11A is top view of a first surface 402 of a synthetic thatch element 400 in accordance with various embodiments;

FIG. 11B is a bottom view of the synthetic thatch element 400 of FIG. 11A, illustrating a second surface 403;

FIG. 11C is a top perspective view of the first surface 402 of the synthetic thatch element 400 of FIG. 11A;

FIG. 11D is a side view of the synthetic thatch element 400 of FIG. 11A;

FIG. 12A is top view of a first surface 502 of a synthetic thatch element 500 in accordance with various embodiments;

FIG. 12B is a bottom view of the synthetic thatch element 500 of FIG. 12A, illustrating a second surface 503;

FIG. 12C is a top perspective view of the first surface 502 of the synthetic thatch element 500 of FIG. 12A;

FIG. 13 is an illustration of certain initial steps of installing a plurality of synthetic thatch elements 100, 200, 300, 400, and/or 500 atop a building structure 600;

FIG. 14 is an illustration of certain intermediate steps of installing a plurality of synthetic thatch elements 100, 200, 300, 400, and/or 500 atop a building structure 600; and FIG. 15 is an illustration of certain finishing steps of installing a plurality of synthetic thatch elements 100, 200, 300, 400, and/or 500 atop a building structure 600.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements.

Unless otherwise defined, all technical and scientific terms used herein have the same meaning as commonly understood by one of ordinary skill in the art to which this invention belongs. The terminology used in the description is for describing particular embodiments only and is not intended to be limiting to embodiments of the present invention. As used in the description, the singular forms "a," "an," and "the" are intended to include the plural forms as well, unless the context clearly indicates otherwise. The term "or" is used herein in both the alternative and conjunctive sense, unless otherwise indicated. The terms "illustrative" and "exemplary" are used to be examples with no indication of quality level.

Unless otherwise indicated, all numbers expressing quantities of dimensions such as length, width, height, and so forth as used in the description are to be understood as being modified in all instances by the term "about." Accordingly, unless otherwise indicated, the numerical properties set forth in the description are approximations that may vary depending on the desired properties sought to be obtained in embodiments of the present invention. Notwithstanding that the approximate numerical ranges and parameters setting forth the broad scope of embodiments of the present invention, the numerical values set forth in the specific examples are reported as precisely as possible. Any numerical values, however, inherently contain certain errors necessarily resulting from error found in their respective measurements.

ELEMENT LIST 10 prior art synthetic thatch
20 prior art natural thatch
100 synthetic thatch element 102 first surface
103 second surface
105 attachment portion
110 fused portion
   112 plurality of frond members
   114 plurality of angled surfaces
   116 plurality of ridges
   118 plurality of valleys
120 serrated portion
   122 plurality of frond members
   124 plurality of angled surfaces
   126 plurality of ridges
   128 plurality of gaps
130 first length
140 second length
   150 short length fronds
   160 long length fronds
   170 medium length fronds
180 greatest total width
190 frond width
200 synthetic thatch element
202 first surface
205 attachment portion
210 fused portion
   212 plurality of frond members
220 serrated portion
   222 plurality of frond members
   228 plurality of gaps
230 first length
240 second length
250 plurality of ripples
300 synthetic thatch element
302 first surface
303 second surface
305 attachment portion
310 fused portion
   312 plurality of frond members
320 serrated portion
   322 plurality of frond members
   328 plurality of gaps
330 first length
340 second length
   350 short length fronds
   360 long length fronds
   370 medium length fronds
380 greatest total width
390 frond width
400 synthetic thatch element
402 first surface
403 second surface
405 attachment portion
410 fused portion
   412 plurality of frond members
420 serrated portion
   422 plurality of frond members
   428 plurality of gaps
430 first length
440 second length
   450 short length fronds
   460 long length fronds
   470 medium length fronds
480 greatest total width
490 frond width
500 synthetic thatch element
502 first surface
503 second surface
505 attachment portion
510 fused portion
   512 plurality of frond members
520 serrated portion
   522 plurality of frond members
   528 plurality of gaps
530 first length
540 second length
   550 base line
   560 end line
   570 fixed length fronds
580 greatest total width
590 frond width Structure of Various Embodiments First Embodiment 100

Turning now to FIG. 2, a synthetic thatch element 100 according to various embodiments is illustrated, comprising at least a first surface 102, a second surface 103 (see FIG. 7), an attachment portion 105, a fused portion 110, and a serrated portion 120. As may be understood from this figure, in conjunction with FIG. 5, in certain embodiments, the synthetic thatch element 100 is generally configured such that the first and second surfaces 102, 103 are opposing surfaces of the element. As a result, in these and still other embodiments, the synthetic thatch element 100 is substantially two-dimensional in shape, with the exception of certain ridges, valleys, and/or ripples, all as will be described in further detail below.

In various embodiments of the synthetic thatch element 100, the attachment portion 105 is generally positioned adjacent an upper edge of the element, namely where a plurality of fused frond members 112 (as will be described later herein) converge and terminate. In this manner, according to certain embodiments, the attachment portion 105 is configured to minimize inadvertent divergence of one or more of the fused frond members 112, whether such be due to age, use, or otherwise. When FIGS. 2 and 7 are viewed in conjunction with one another, it should be understood that the attachment portion 105 folds over the upper edge of the synthetic thatch element 100, thereby covering at least a minimal portion of both the first surface 102 and the second surface 103 of the element.

Returning to FIG. 2, with reference also to FIG. 5, the attachment portion 105 may be configured in various embodiments to provide a dedicated portion that is desirable for attachment of the synthetic thatch element 100 to a building roofing structure. For example, upon installation, as will be described in further detail below, the synthetic thatch element 100 may be operatively affixed to the roofing structure at least adjacent the attachment portion 105. In certain embodiments, such affixing may be via staples, nails, or the like, while in other embodiments, such affixing may be selectively removable, via, for example, Velcro, adhesives, or the like. It should be understood, however, that these are non-limiting examples and the synthetic thatch element 100 may be affixed to a roofing structure (or otherwise) in any of a variety of means, as described in further detail below. It should also be understood that other portions of the synthetic thatch element 100 may likewise and/or alternatively be used to affix the element, as may be desirable for particular applications, particularly so in those embodiments that may not necessarily include an attachment portion (see e.g., FIGS. 12A-C, as will be described in further detail below).

Figure 1:
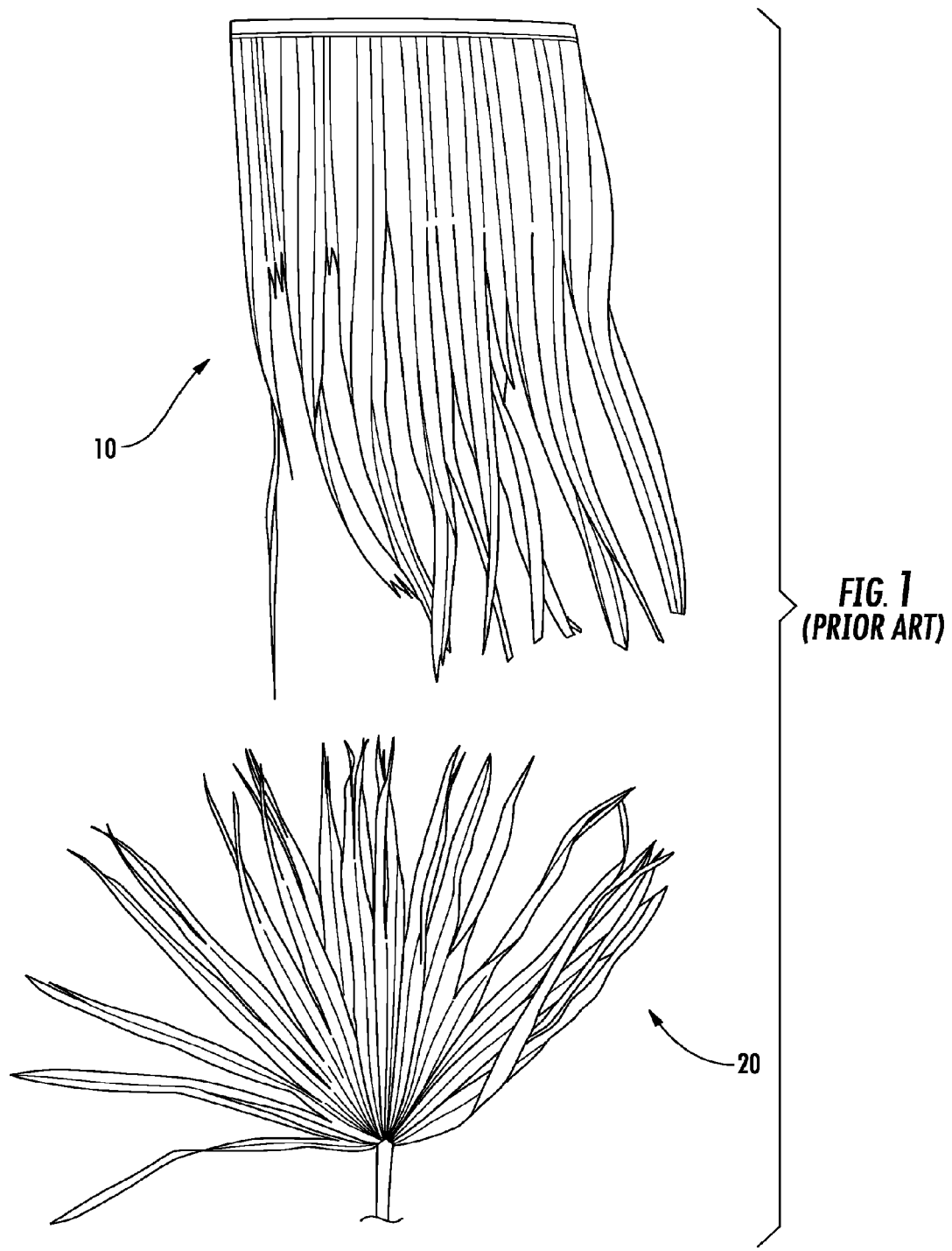
FIG. 1 is a view of a prior art synthetic thatch element 10 and a natural palm frond 20, as referenced throughout for purposes of distinguishing various embodiments of the present invention.

In various embodiments of the synthetic thatch element 100, the first surface 102 may comprise the respective fused and serrated portions 110, 120. In certain embodiments, the fused portion 110 may substantially correspond to an upper-oriented or intermediate portion of the element 100, extending from the attachment portion 105 to the serrated portion 120, as will be described further below. In certain embodiments, the fused portion 110 may comprise a plurality of frond members 112, extending longitudinally from the attachment portion 105 to the serrated portion 120. In this manner, in these and other embodiments, the fused portion 110 is configured to substantially resemble a palm frond, with the plurality of frond members 112 representing the individual frond "leaves," as may also be understood with reference, by analogy, to FIG. 1. In the fused portion 110, each of the plurality of frond members 112 are positioned substantially adjacent one another (i.e., fused), as will be described in further detail below.

Returning to FIG. 2 and with further reference to FIG. 3, it may be seen that various embodiments of the plurality of frond members 112 of the fused portion 110 are formed from a plurality of angled surfaces 114. In certain embodiments, the plurality of angled surfaces 114 are alternating in orientation, with adjacently positioned surfaces being oppositely positioned (e.g., one angled upwardly and the next angled downwardly or vice versa). In this manner, the plurality of angled surfaces 114 form a plurality of corresponding ridges 116 and valleys 118, giving to the synthetic thatch element 100 the resemblance of a natural thatch element having individually formed fronds and/or reeds.

With particular reference to FIG. 3, it should be understood that the plurality of ridges 116 are formed at the intersection of successively positioned upwardly and then downwardly oriented angled surfaces 114. In a similar fashion, according to various embodiments, the plurality of valleys 118 are formed at the intersection of successively positioned downwardly and then upwardly oriented angled surfaces 114. In this manner, the successive ridges 116 and valleys 118 are likewise alternating, as were the respective angles of the plurality of angled surfaces 114. For example, moving from the left, a ridge 116 would be followed by a valley 118, which would then be followed by another ridge 116, so forth and so on. In these and other embodiments, such a configuration of alternating ridges 116 and valleys 118 further contributes to the degree of resemblance the synthetic thatch element 100 has with traditional natural thatch elements. It should further be understood that in the fused portion 110, the respective valleys 118 in certain embodiments are those particular features of the frond members 112 that are "fused" relative to one another so as to form an impermeable surface, as will be described in further detail below.

Indeed, according to various embodiments, the fused portion 110 may be configured to be substantially impervious. In this manner, the fused portion 110 may prevent moisture or other external elements (e.g., rain, dirt, or the like) from passing through the element and to the interior of a structure upon which the element is mounted. In certain embodiments, the successive ridges 116 and/or valley 118 of the plurality of angled surfaces 114 of the fused portion 110 may be individually fused relative to one another so as to form the impervious surface of the fused portion 110. Of course, in other embodiments, the fused portion 110 or even the synthetic thatch element 100 in its entirety may be formed as a single unitary piece, as will be described in further detail below with reference to at least FIGS. 10A-D. It should be understood that for any such configurations, the "fused" and/or unitary nature of the fused portion 110 substantially contributes to the imperviousness thereof and also of the element 100 in its entirety.

Referring momentarily to FIG. 6, various embodiments of the synthetic thatch element 100 may be configured such that the fused portion 110 has a specific length 130. In certain embodiments, the length 130 may be approximately two (2) feet, while in other embodiments the length 130 may be substantially less than or more than two (2) feet, as may be desirable for particular applications. In still other embodiments, the length 130 may be in a range from approximately 1 foot to 3 feet. An exemplary dimension of the length 130 is twenty-one (21) inches. That being said, it should be understood that any of a variety of lengths 130 may be incorporated for the fused portion 110 of the synthetic thatch element 100, as may be beneficial for particular applications.

Remaining with FIG. 6, but with reference also to FIG. 4, the fused portion 110 according to various embodiments may have a greatest width 180, which may be used in conjunction with the length 130 to at least in part define a surface area covered by the fused portion. In at least the illustrated embodiment, the total surface area coverage may be approximately one (1) square foot. To obtain such exemplary coverage, the greatest width 180 may be, in certain embodiments, roughly two (2) feet. In other embodiments, the greatest width 180 may be may be in a range from approximately 1 foot to 3 feet. An exemplary dimension of the greatest width 180 is twenty-two (22) inches. That being said, it should be understood that any of a variety of greatest widths 180 may be used for the fused portion 110 of the synthetic thatch element 100, as may be beneficial for particular applications.

Still further, it should be understood that according to various embodiments, the exemplary total surface area of the fused portion 110 of approximately one (1) square foot is obtained due at least in part to the narrowing arc of the fused portion 110 nearer the attachment portion 105, as compared to the greatest width 180, which is typically further adjacent the serrated portion 120. As such, the width of the fused portion 110 may be substantially less than the greatest width 180 substantially adjacent the attachment portion 105.

Varying width along the length of the fused portion 110 enables variation in the total surface area that is covered by the fused portion 110 and thus that surface area of an associated roofing structure which is rendered impervious by the fused portion. In certain embodiments, the total surface area may be substantially less than or more than the exemplary one (1) square foot. In other embodiments, the surface area may range from ½ square foot to five square feet. That being said, it should be understood that any of a variety of surface areas defined at least in part by length 130 and greatest width 180 may be incorporated within the synthetic thatch element 100, as may be beneficial for particular applications.

Remaining still further with FIG. 4, it should further be understood that within the fused portion 110 (and even additionally within the serrated portion), each of the plurality of frond members 112, 122 may have a width 190, determined at least in part by the dimensions of the greatest width 180. It should be understood that in certain embodiments, like the greatest width, the frond member widths 190 may likewise taper towards the attachment portion 105. In one exemplary embodiment, the width 190 is roughly one (1) inch where the greatest width 180 is twenty-two (22) inches, resulting in approximately twenty-two (220 frond members 112, 122 across the fused and serrated portions of the element 100. Of course, in other embodiments, the width 190 may range from approximately ½ inch to 3 inches, as may be desirable for a particular application. In such embodiments, the greatest width 180 may experience a resulting reduction or increase in dimension. In still other embodiments, the width 190 of each individual frond member and the greatest width 180 of the fused portion in its entirety may be independent relative to one another, in which case an increase in the width 190 with a fixed greatest width 180 will result in a fewer number of individual frond members. Of course, any of a variety of interrelationships between these and other dimensions of the fused portion may be envisioned, all as within the scope of the present invention.

Returning to FIG. 2, as previously mentioned, in various embodiments of the synthetic thatch element 100, the first surface 102 may comprise the respective fused and serrated portions 110, 120. In certain embodiments, the serrated portion 120 may substantially correspond to a lower portion of the element 100, extending from the fused portion 110 to a lower edge of the element, as will be described further below. In certain embodiments, the serrated portion 120 may comprise a plurality of frond members 122, extending longitudinally from the fused portion 110 to a lower edge of the element. In this manner, in these and other embodiments, the serrated portion 120 is configured to substantially resemble a palm frond, with the plurality of frond members 122 representing the individual frond "leaves," as may be understood with reference to FIG. 1. That being said, in contrast with the frond members 112 of the fused portion 110, the frond members 122 are not fused relative to one another, as will be described in further detail below.

Remaining with FIG. 2 and with further reference to FIG. 4, it may be seen that various embodiments of the plurality of frond members 122 of the serrated portion 120 are formed from a plurality of angled surfaces 124. In certain embodiments, the plurality of angled surfaces 124 are alternating in orientation, with adjacently positioned surfaces being oppositely positioned (e.g., one angled upwardly and the next angled downwardly or vice versa). In this manner, the plurality of angled surfaces 124 form a plurality of corresponding ridges 116, giving to the synthetic thatch element 100 the resemblance of a natural thatch element having individually formed fronds and/or reeds.

Remaining with FIG. 4, it should be understood that, in contrast with the ridges and valleys (116, 118) formed by the frond members 112 of the fused portion 110, the plurality of frond members 122 of the serrated portion 120 form successive ones of a plurality of gaps 128 as opposed to valleys. In certain embodiments, as is particular evident from at least FIG. 4, but also FIGS. 5 and 6, such is due to the frond members 122 being serrated relative to one another, so as to resemble individually extending fronds, reeds, or leaves. In other words, adjacently positioned downwardly and then upwardly oriented angled surfaces 124 do not physically contact one another, but instead are spaced relative to one another a particular distance.

According to various embodiments, the distance between (e.g., the width of the gaps 128 between) successive frond members 122 of the serrated portion 120 may vary across the width of the synthetic thatch element 100 and also along the length of the element. In other words, as is evident from at least FIG. 4, the frond members 122 are closer relative to one another substantially adjacent the fused portion 112, while growing increasingly further apart along their length toward the lower edge of the synthetic thatch element 100. Of course, it should be understood that the distance between successive frond members 122 need not linearly and/or regularly expand along their length, but may instead expand and retract in an irregular fashion, so as to better resemble the irregularities found in natural thatch elements, such as those seen as (20) in FIG. 1. Still further, it should be understood from FIG. 4 in conjunction with FIG. 6, that the serrated portion 120, in contrast with the fused portion 110 is generally configured to not be substantially impervious. In this manner, the serrated portion 120 may be layered atop adjacently positioned fused portions 110 (e.g., of adjacently positioned synthetic thatch elements 100), as will be described in further detail below.

Remaining with FIG. 4, it should be understood that the gaps 128 and their associated widths are formed, at least in part, due to a narrowing taper of the width of each of the plurality of frond members 122 between the fused portion and the lower edge of the element 100. In other words, nearer the lower edge, the gaps 128 increase in width and the frond members 122 decrease in width until coming to an end at a substantially tip-shaped portion. In this manner, it should be understood that the frond width 190, as described previously herein with respect to the fused portion 110 does not extend the length of the element 100, but instead decreases gradually upon passage into the serrated portion 120. As a non-limiting example, for a frond member 112 having a width 190 of approximately one (1) inch, the average width thereof upon passage into the serrated portion (and thus referred to as frond member 122) may be approximately ½ inch, with the greatest width occurring substantially adjacent the fused portion 110 and the smallest width (e.g., a point) occurring substantially adjacent a lower end of the element 100.

It should further be understood from at least FIG. 2 that according to various embodiments each respective frond member 112 of the fused portion 110 corresponds to and substantially mates with a respective frond member 122 of the serrated portion 120, such that together the respectively paired members 112, 122, each travel an entirety of the length of the synthetic thatch element 100. In certain embodiments, each of the respective angled surfaces 114, 124 correspond to and substantially mate with one another in substantially the same manner, as do at least the plurality of ridges 116, 126. Of course, it should be understood that in these and still other embodiments the correspondence and mating between these respective frond members and elements may be seamless, such that visibly speaking—no distinction is perceivable between the two on an exemplary manufactured synthetic thatch element 100.

Returning to FIG. 4, it should further be understood that the plurality of ridges 126 of the serrated portion 120 cause each frond member 122 to extend upwardly toward the ridges 126 on the first surface 102 of the synthetic thatch element 100. Such in these and other embodiments, causes the frond members 122 to substantially resemble raised leaves, reeds, or fronds of naturally occurring thatch elements. As such, and as will be described in further detail below, the frond members 122 will be inverted when viewed relative to the second surface 103. In other words, in certain embodiments, the frond members 122 may be configured to form a plurality of ridges 126 on a first surface 102 of the element and a plurality of valleys (not numbered) on a second surface 103 of the element. Of course, it should be understood that the frond members 122 may be alternatively configured such that, as a non-limiting example, ridges 126 are formed relative to the second surface 103, as may be desirable for a particular applications.

Referring now more specifically to FIG. 6, various embodiments of the synthetic thatch element 100 may be configured such that the serrated portion 120 has a specific length 140. In certain embodiments, the length 140 may be approximately one (1) foot, while in other embodiments the length 140 may be substantially less than or more than one (1) foot, as may be desirable for particular applications. In still other embodiments, the length 140 may be in a range from approximately ½ foot to 3 feet. That being said, it should be understood that any of a variety of lengths 140 may be incorporated within the synthetic thatch element 100, as may be beneficial for particular applications.

Remaining with FIG. 6, it should also be understood that the length 140 may vary across frond members 122, with various short length fronds 150, long length fronds 160, and medium length fronds 170 being interspaced relative to one another across the total width of the serrated portion 120. In certain embodiments, the majority of the short length fronds 150 may be substantially adjacent the side edges of the element, so as to provide a slightly arc-shaped structure to the element, further mirroring that of the natural palm fronds of, for example, FIG. 1. That being said, it should be understood that according to various embodiments, the variable length fronds 150, 160, and 170 may be essentially randomly dispersed across the width of the element, so as to avoid a pre-manufactured appearance.

Generally speaking, the average length across the various length fronds 150, 160, and 170 according to various embodiments substantially equates to the length 140. As such, in the exemplary embodiment in which the length 140 is substantially one (1) foot, it should be understood that the length 150 will be less than one (1) foot, the length 160 will be approximately one (1) foot, and the length 170 will be greater than one (1) foot. Any of a variety of variations may be envisioned, where perhaps two of the three types of fronds may be greater than the length 140, with the third being much less than the length; or vice versa; or any combination thereof, as may be desirable for particular applications.

Still further, when viewing FIG. 6 in conjunction with at least FIGS. 2 and 4, it should further be understood that the length 140 of the serrated portion 120 may, according to various embodiments fluctuate across a width of the synthetic thatch element 100, due at least in part to the varying lengths 150, 160, 170, as previously described herein. In certain embodiments, for example, the length 140 of the serrated portion 120 may increase toward a central portion of the synthetic thatch element 100, tapering to a shorter length adjacent the opposing side edges of the element, as is particularly evident from FIG. 4. Of course, it should be understood that the length 140 may further vary in regular and/or irregular fashions across the entirety of the synthetic thatch element 100, as may be desirable for particular applications. Indeed, such regular and/or irregular variations across certain elements and/or between different elements, contributes in these and still other embodiments to the resemblance of the synthetic thatch element 100 to naturally occurring thatch elements, as have been previously described herein.

Remaining with FIG. 6, but with reference also to FIG. 5, the serrated portion 120 according to various embodiments may also have a width (visible, but not numbered), which may be used in conjunction with the length 140 to define a surface area covered by the serrated portion. As may be seen from at least FIG. 4, the width of the serrated portion may correspond substantially to the greatest width 180 of the fused portion 110 in certain embodiments, although the serrated width may be greater than width 180 in other embodiments, such as that of FIG. 11A. That being said, in at least the illustrated embodiment of FIGS. 4 and 6, the surface area of the serrated portion may be approximately one (1) square foot. Of course, in certain embodiments, the surface area of the serrated portion 120 may be substantially less than or more than one (1) square foot, as may be desirable for particular applications. In other embodiments, the surface area may range from ½ square foot to five square feet. That being said, it should be understood that any of a variety of surface areas defined at least in part by length 140 may be incorporated within the synthetic thatch element 100, as may be beneficial for particular applications.

Returning now to FIG. 6, but also referring to FIG. 2, it may be further seen that beyond the above-described variations in lengths 130, 140 and/or frond members 112, 122—the relative proportions of the fused portion 110 and the serrated portion 120 of various synthetic thatch elements 100 may further vary, whether in a regular and/or irregular fashion. In certain embodiments, the fused portion 110 may be configured to comprise approximately 60% of the surface area of the synthetic thatch element 100 in its entirety, with the serrated portion 120 comprising the remainder. However, in other embodiments, the fused portion 110 may be substantially less than or more than approximately 60% of the surface area of the element 100. In still other embodiments, the fused portion 110 may range from 40% to 80% of the surface area of the element 100, as may be desirable for particular applications. In one exemplary embodiment, the total width of the element 100 may be approximately twenty-two (22) inches and its total length may be thirty-two (32) inches, the fused portion having a length therein of approximately twenty-one (21) inches and the serrated portion having a length therein of approximately eleven (11) inches, thereby resulting in the serrated portion comprising approximately 34% of the total surface area of the element 100. Other combinations may be envisioned, all as within the scope of the present invention.

In various embodiments, as may be understood perhaps best from FIG. 5 (or from FIG. 10D by analogy, as described later herein), the synthetic thatch element 100 may be configured to be approximately 1/16 of an inch thick across the entirety of its two-dimensional surface area. Of course, in other embodiments, the thickness of the element 100 may be slightly more or less than 1/16 of an inch, as may be desirable for particular applications. In still other embodiments, the thickness may be substantially more than 1/16 of an inch, although likely never substantially less than 1/16 of an inch due to stability and rigidity concerns. In various embodiments, it should be understood that the thickness, like the widths of certain frond members, may taper from a relatively thicker thickness substantially adjacent the attachment portion to a substantially negligible thickness adjacent the tip/end of the serrated portion. In such embodiments, the average thickness may be approximately 1/16 of an inch, although still other exemplary thicknesses may be adopted, depending upon the nature of particular applications.

Referring back now to FIG. 2, it should be understood that various components of the synthetic thatch element 100 may, according to various embodiments, be constructed from a single piece of material, with perhaps the exception, in certain embodiments, of the attachment portion 105, which may later (e.g., after molding) fused to the remainder of the element. In other embodiments, however, it may be beneficial to individually form certain portions or components of the synthetic thatch element 100, only to fuse the respective portions or components upon fabrication and prior to use. Each of these and various alternative methods of formation will be described in further detail below and as such, should not be considered limiting with regard to the structural configuration of the element 100. As yet another non-limiting example, each of the frond members 112 may be individually formed, only to later (e.g., after molding) be fused relative to one another. Of course, to maximize imperviousness, the frond members 112 may be molded from a single piece of material, as will be described in further detail below with respect to at least FIGS. 10A-D.

For various embodiments of the synthetic thatch element 100, with reference to FIG. 7, it should be understood that the second surface 103 of the element may be, according to various embodiments, substantially a minor image of the first surface 102, as has been described in detail herein above. For example, in certain embodiments, the second surface 103 may likewise comprise an attachment portion 105, a fused portion 110, and a serrated portion 120 substantially the same in structure, shape, and/or configuration as that of the first surface 102. Indeed, it should be understood that the first and second surfaces 102, 103 are merely opposing sides of single attachment portions 105, fused portions 110, and/or serrated portions 120, and that a single synthetic thatch element 100, in these and still other embodiments may include only one of such features (versus two).

As such, it should be further understood that where ridges and/or valleys were described previously herein with respect to first surface 102, such ridges and/or valleys, when viewed with respect to the second surface 103, will form mirror images thereof. For example, each of the plurality of ridges 116 of the fused portion 110 and/or the ridges 126 of the serrated portion 120 will appears as valleys when viewed from the second surface 103 as opposed to the first surface 102. Similarly, in these and still other embodiments, the angle surfaces 114, 124, will likewise be oppositely oriented (e.g., upwardly oriented relative to the first surface, but downwardly oriented relative to the second surface.

At least one advantage of such a configuration is that the natural thatch structure of the first surface 102, which may be installed as an outward facing surface on an associated structure, also exists on the opposing second surface 103. In such scenarios, where the second surface 103 may be installed as an inward facing surface on an open frame structure, the natural thatch structure of the second surface 103 is likewise visible. Such is in contrast with traditional synthetic thatch elements, which possess a substantially planar second surface, even though such may be visible on associated structures.

Second Embodiment 200

Turning now to FIGS. 8 and 9, a synthetic thatch element 200 according to various embodiments is illustrated, comprising at least a first surface 202, a second surface (not shown, but understood by analogy to the second surface 103 of the first embodiment 100, as previously described herein), an attachment portion 205, a fused portion 210, and a serrated portion 220. As may be understood from these figures, the synthetic thatch element 200 may, in certain embodiments, further comprise a plurality of irregularities 250 formed on one or both of the first and second surfaces of the element. In these and still other embodiments, the plurality of irregularities 250 may comprise any combination or variation of the non-limiting examples of bumps, dips, ripples, undulations, waves, or the like, as may best be seen, perhaps from FIG. 9.

Remaining with FIG. 9, it may further be understood that the plurality of irregularities 250 may be scattered across the width and length of the first surface 202 (and/or second surface) of the synthetic thatch element 200. According to various embodiments, the irregularities 250 may be randomly positioned, while in other embodiments, such may be positioned relative to a predetermined pattern or frequency, as may be desirable for particular applications. In these and still other embodiments, however, it should be understood that the irregularities 250 may be located on either the fused portion 210 or the serrated portion 220 of the synthetic thatch element 200, or even across some percentage of both portions. Of course, across any and all of these and even other envisioned embodiments, the irregularities 250 are configured to further facilitate the resemblance of the synthetic thatch element 200 to naturally occurring thatch elements such as the palm frond (20) of FIG. 1, as also previously described herein.

Remaining still with FIGS. 8 and 9, in the various configurations of the embodiment 200 illustrated in those figures, it should be understood that any remaining structural features, including, but not limited to the plurality of frond members 212 of the fused portion 210, the plurality of frond members (not numbered, but as may be understood by analogy to 122 of element 100) of the serrated portion 220, the plurality of gaps 228 of the serrated portion 220, the first length 230, the second length 240 (including any short, medium, or long lengths included there; not numbered, but as may be understood by analogy to 150, 160, and 170, respectively), and/or any combination thereof may be substantially the same in structure, shape, and/or configuration to the plurality of frond members 112 of the fused portion 110, the plurality of frond members 122 of the serrated portion 120, the plurality of gaps 128 of the serrated portion 120, the first length 130, the second length 140, the short length fronds 150, the long length fronds 160, and/or the medium length fronds 170 of the synthetic thatch element 100, as illustrated in FIGS. 2-7 and discussed previously herein.

Alternatively, any one or combination of such features (or still further features) may be in some fashion substantially and/or minimally different in structure, shape, and/or configuration from that of corresponding features of the synthetic thatch element 100 illustrated in FIGS. 2-7 and discussed above, provided such does not depart from the inherent scope and intent of the various embodiments. Indeed, it should generally be understood that in at least the illustrated embodiment, the primary distinction between elements 100, 200 lies in the plurality of irregularities 250, as previously described in detail herein. In these and still other embodiments, it should be further understood that relative dimensions of various features may be analogous to those corresponding features of element 100, as also previously described herein.

Third Embodiment 300

Turning now to FIGS. 10A-D, a synthetic thatch element 300 according to various embodiments is illustrated, comprising at least a first surface 302, a second surface 303 (see FIG. 10B), an attachment portion 305, a fused portion 310, and a serrated portion 320.

As may be understood from these figures, the synthetic thatch element 300 may, according to various embodiments, differ primarily from the synthetic thatch element 100 of FIGS. 2-7 in that it may be made from a single piece of material, as opposed to a plurality of individual "frond" portions that may be arranged and/or fused relative to one another in either a "fused" or "serrated" fashion to form the element 100, all as previously described herein.

In certain embodiments, yet another distinction exists in that although certain embodiments of the element 100 have been described previously herein as having a relatively fixed thickness (e.g., 1/16 inch), the thickness of the element 300 may vary along its length. In at least the illustrated embodiment, a taper of the thickness is evident, ranging from a thickest portion substantially adjacent the attachment portion 305 to a thinnest portion substantially adjacent the lower tip (not numbered). Of course, the taper may further vary wherein the element 300 may, according to still other embodiments, incorporate one or more ripples, such as the ripples 250 of element 300. Indeed, in still other embodiments, any of a variety of variations in local thicknesses of the element 300 may be envisioned, as may be desirable for particular applications.

As such, it should be understood that the remaining structural features illustrated in FIGS. 10A-D, including, but not limited to the plurality of frond members 312 of the fused portion 310, the plurality of frond members 322 of the serrated portion 320, the plurality of gaps 328 of the serrated portion 320, the first length 330, the second length 340, the short length fronds 350, the long length fronds 360, the medium length fronds 370, the greatest total width 380, the individual frond width 390, and/or any combination thereof may be substantially the same in structure, shape, and/or configuration to the plurality of frond members 112 of the fused portion 110, the plurality of frond members 122 of the serrated portion 120, and/or the plurality of gaps 128 of the serrated portion 120, the first length 130, the second length 140, the short length fronds 150, the long length fronds 160, the medium length fronds 170, the greatest total width 180, and/or the individual frond width 190 of the synthetic thatch element 100, all as illustrated in FIGS. 2-7 and discussed above. Alternatively, any one or combination of such features may be substantially the same as those corresponding features of synthetic thatch element 200. For example, the synthetic thatch element 300 may further comprise a plurality of ripples, such as the ripples 250 of element 200, as described previously herein.

Of course, it should also be understood that any combination of the structural features of element 300 (or still further features) may be in some fashion substantially and/or in some degree different in structure, shape, and/or configuration from that of corresponding features of the synthetic thatch elements 100 or 200, provided such does not depart from the scope and intent of the various embodiments. Indeed, it should generally be understood that in at least the illustrated embodiment of FIGS. 10A-D, the primary distinction between element 300, as compared to elements 100, 200 lies in formation thereof from a single piece of material, as opposed to fusing of individual pieces of material (e.g. frond portions) into a single element. In these and still other embodiments, it should be further understood that relative dimensions of various features may be analogous to those corresponding features of elements 100 or 200, as previously described herein.

Fourth Embodiment 400

Turning now to FIGS. 11A-D, a synthetic thatch element 400 according to various embodiments is illustrated, comprising at least a first surface 402, a second surface 403 (shown in FIG. 11B), an attachment portion 405, a fused portion 410, and a serrated portion 420.

As may be understood from these figures, the synthetic thatch element 400 may, according to various embodiments, differ primarily relative to the elements 100, 200, 300, as have been described previously herein, in that the element 400 may have its greatest width 480 substantially within the serrated portion 420, versus alternative embodiments (e.g., element 100) wherein the greatest width (e.g., width 180) lies substantially within the fused portion of the element. In this manner, it should be understood that the primary advantage of such a configuration is a broader coverage of the serrated portion than otherwise possible, resulting in a more "fan-like" structural configuration of the element 400, as compared to the generally fixed width structural configuration of at least the serrated portion of element 100.

That being said, it should be understood that the remaining structural features illustrated in FIGS. 11A-D, including, but not limited to the plurality of frond members 412 of the fused portion 410, the plurality of frond members 422 of the serrated portion 420, the plurality of gaps 428 of the serrated portion 420, the first length 430, the second length 440, the short length fronds 450, the long length fronds 460, the medium length fronds 470, the individual frond width 490, and/or any combination thereof may be substantially the same in structure, shape, and/or configuration to the plurality of frond members 112 of the fused portion 110, the plurality of frond members 122 of the serrated portion 120, and/or the plurality of gaps 128 of the serrated portion 120, the first length 130, the second length 140, the short length fronds 150, the long length fronds 160, the medium length fronds 170, the greatest total width 180, and/or the individual frond width 190 of the synthetic thatch element 100, as illustrated in FIGS. 2-7 and discussed above.

Alternatively, any one or combination of such features may be substantially the same as those corresponding features of either of synthetic thatch elements 200 or 300 and/or any combination thereof. For example, the synthetic thatch element 400 may comprise a plurality of ripples analogous to ripples 250 of element 200, as described previously herein. In these and still other embodiments, it should be further understood that relative dimensions of various features may be analogous to those corresponding features of any one of elements 100, 200 or 300, as previously described herein.

Of course, it should also be understood that any combination of the structural features of element 400 (or still further features) may be in some fashion substantially and/or in some degree different in structure, shape, and/or configuration from that of corresponding features of the synthetic thatch elements 100 or 200 or 300, provided such does not depart from the scope and intent of the various embodiments. Indeed, it should generally be understood that in at least the illustrated embodiment of FIGS. 11A-D, the primary distinction between element 400, as compared to elements 100, 200, 300 lies in the more "fan-like" configuration, as described immediately above, and as due at least in part to the translation of the greatest width 480 such that it occurs substantially within the serrated portion 420 versus the fused portion 410 of the element.

Fifth Embodiment 500

Turning now to FIGS. 12A-C, a synthetic thatch element 500 according to various embodiments is illustrated, comprising at least a first surface 502, a second surface 503 (shown in FIG. 12B), a fused portion 510, and a serrated portion 520.

As may be understood from these figures, the synthetic thatch element 500 may, according to various embodiments, differ primarily relative to the elements 100, 200, 300, 400 as have been described previously herein, in that the element 500 may (1) comprise frond members 522 of substantially uniform length 555; and (2) not necessarily comprise an attachment portion (see e.g., FIG. 2). With respect to the attachment portion (or lack thereof), it should be understood that according to certain embodiments, the plurality of frond members 512, 522 may be integrally formed (e.g., molded) from a single piece of material (see also third embodiment 300), thus at least in part eliminating the need for incorporating an attachment portion to retain the same relative to one another. In these and still other embodiments, the element 500 may be attached to an associated building structure at any desirable location upon the element itself, without regard to any attachment portion, which might likewise be reserved in at least certain embodiments for mounting mechanisms, as previously described herein.

Still further, according to various embodiments, the element 500 may comprise frond members 522 within the serrated portion 520 that are all of substantially the same length 555 (e.g., a fixed length versus individual frond members of variable length), extending from a separation line 550 demarking the serrated portion relative to the fused portion 510 and to a tip line 560. In certain embodiments, the length 555 may be approximately one (1) foot, while in other embodiments the length 555 may be substantially less than or more than one (1) foot, as may be desirable for particular applications. In still other embodiments, the length 555 may be in a range from approximately ½ foot to 3 feet. That being said, it should be understood that any of a variety of lengths 555 may be incorporated within the synthetic thatch element 500, as may be beneficial for particular applications. In at least the illustrated embodiment, the length 555 is approximately eleven (11) inches.

All of the above being said, it should be understood that the remaining structural features illustrated in FIGS. 12A-C, including, but not limited to the plurality of frond members 512 of the fused portion 510, the plurality of frond members 522 of the serrated portion 520, the plurality of gaps 528 of the serrated portion 520, the first length 530, the greatest width 580, the individual frond width 490, and/or any combination thereof may be substantially the same in structure, shape, and/or configuration to the plurality of frond members 112 of the fused portion 110, the plurality of frond members 122 of the serrated portion 120, and/or the plurality of gaps 128 of the serrated portion 120, the first length 130, the greatest total width 180, and/or the individual frond width 190 of the synthetic thatch element 100, as illustrated in FIGS. 2-7 and discussed above.

Alternatively, any one or combination of such features may be substantially the same as those corresponding features of either of synthetic thatch elements 200, 300, or 400, and/or any combination thereof. For example, the synthetic thatch element 500 may comprise a plurality of ripples analogous to ripples 250 of element 200, as described previously herein. Still further, the element 500 may be further "fan shaped," as element 400.

Of course, it should also be understood that any combination of the structural features of element 500 (or still further features) may be in some fashion substantially and/or in some degree different in structure, shape, and/or configuration from that of corresponding features of the synthetic thatch elements 100 or 200 or 300 or 400, provided such does not depart from the scope and intent of the various embodiments. Indeed, it should generally be understood that in at least the illustrated embodiment of FIGS. 12A-C, the primary distinction between element 500, as compared to elements 100, 200, 300, 400 lies in the uniform length 555 of the frond members of the serrated portion 520, resulting in a substantially planar end/tip surface (versus the fan-like end/tip surface of other embodiments) and/or the lack of a specific attachment portion due at least in part to the formation of the element 500. In these and still other embodiments, it should be further understood that relative dimensions of various features of element 500 may be analogous to those corresponding features of elements 100 or 200 or 300 and/or 400, each as previously described herein.

Materials, Shapes, Sizes, and Appearances of Various Embodiments

Any polymer or mixture of polymers known in the art may be used to prepare the synthetic thatch elements 100, 200, 300, 400, and/or 500 according to various embodiments. Non-limiting examples include polyolefins, polyvinyl chloride, polyesters, polycarbonates, polyamides, ethylenes copolymers, polyphenylene oxide, polystyrenes, and polyacrylates. In certain embodiments, the polymers may be mixed in a molten state before forming the synthetic thatch element, as will be described in further detail below. In other embodiments, the polymers may be mixed as the thatch element is formed, whether inside of a die or mold or outside thereof, for example, by adhering individual layers together in a laminate-like structure. These and other various plastic injection molding processes will be described in further detail below.

In any of these and still other embodiments, it should be understood that the polymer material may be virgin, recycled, or any combination thereof, as may be readily available and/or desirable for particular applications. Still further, it should be understood that while certain embodiments may be solidly formed, others may incorporate hollow portions and/or internal cavities between and within the synthetic thatch elements 100, 200, 300, 400, and/or 500, whether for structural weight considerations or otherwise.

Various embodiments of synthetic thatch elements 100, 200, 300, 400, and/or 500 may contain one or more additional ingredients beyond the above-described polymers, as may be desirable for certain applications. Non-limiting examples of such ingredients include plasticizers, flame retardant additives, UV light stabilizers, pigments, clays, dyes, beads, reinforcements, foaming agents, and/or colorants. In certain embodiments, the synthetic thatch elements 100, 200, 300, 400, and/or 500 may contain natural-appearing color variegation, or a mix of two or more solid colors to create desirable color blends, hues, and/or highlights. In other embodiments, any of a variety of type and number of colors may be incorporated, provided such substantially replicate natural flora within a building product's natural habitat. It should, of course, be understood that color variegation may be within an individual thatch element 100, 200, 300, 400, and/or 500 and/or between different thatch elements forming an array for construction, as will be described in further detail below.

Various embodiments of synthetic thatch elements 100, 200, 300, 400, and/or 500 may be manufactured and formed in a variety of shapes, at least some exemplary embodiments of which have generally been described previously herein with reference to associated structural features and figures. However, while any of a variety of shapes may be contemplated, although such generally adopted shapes comprise those at least somewhat similar to that of natural thatch 20, as illustrated, for example, in the prior art illustration of FIG. 1. As a non-limiting example, in certain embodiments, the thatch element may be formed to have a substantially round or oval cross-section, similar in shape to a palm frond. Of course, still other embodiments may be formed with a plurality of elongate strips, similar to blades of grass, which may be subsequently adhered relative to one another to create the above-referenced round or oval cross-section, or alternatively, still another desirable cross-section, as may be desirable for particular applications. In various embodiments, as has been previously described herein, some embodiments may have a broader spread (e.g., wider gaps between successive fronds) than others, all as may be desirable for particular applications.

Still further, it should further be understood that various embodiments of synthetic thatch elements 100, 200, 300, 400, and/or 500 may be manufactured and formed in a variety of sizes and dimensions, at least some exemplary embodiments of which have generally been described previously herein with reference to associated structural features and figures. The length of each thatch element may be customized to fit a particular use to which it is being applied. Still further, the relative lengths of the exemplary first lengths 130, 230, 330, 430, 530 and the exemplary second lengths 140, 240, 340, 440, 540 (as previously described herein) may any one or combination thereof also be adjusted, as desirable, with the understanding that adjusting the first lengths directly impacts the surface area of the thatch elements 100, 200, 300, 400, and/or 500 that is substantially impervious to environmental conditions, such as rainwater. Remaining dimensions, such as width, thickness, circumference, diameter, or other appropriate dimension, may also be customized according to user preference or application. For example, when forming a corner of a roofing surface (as will be described in further detail below), it may be desirable to trim at least one of a side or bottom portion of the thatch elements 100, 200, 300, 400, and/or 500, so as to form a clean edge surface. Still further, in certain embodiments, it may be desirable to widen the "fan" of the synthetic thatch elements 100, 200, 300, 400, and/or 500, either by cutting and spreading apart an additional portion of the fronds, or otherwise.

Various embodiments of synthetic thatch elements 100, 200, 300, 400, and/or 500 may be configured to have formed integrally on at least one surface thereof a textured surface portions that substantially replicates the textured surface portions of naturally occurring thatch elements. In certain embodiments, the textured surface portions, which may be understood generally from FIGS. 2-9, may be regular, such as a raised ridge or an indentation that does not vary substantially along the length of the thatch element, as has been described in further detail previously herein. In other embodiments, the textured surface portions may not substantially vary, but only extend along a portion of the length of the thatch element (e.g., a portion that will be visible from above/below and not covered by an adjacently positioned element). In still other various embodiments, the textured surface portions may be irregularly formed, individually and/or relative to the length of the thatch element. Non-limiting examples of textured irregularities include bumps, crevices, cracks, pores, and/or ripples, as may be desirable for particular applications.

Still further, in any of these and still other embodiments, it should be understood that any combination of regular and/or irregular textured surface portions may be incorporated onto a particular thatch element 100, 200 (or across multiple elements within an array, as described below), as may be desirable for particular applications. Of course, it should be understood that however incorporated, the textured surface portions will generally be present on at least a portion of both sides (e.g., 102/103, 202/203, 302/303, 402/403, and 502/503) so as to replicate the natural thatch texture on both sides of the elements, so as to ensure visibility thereof from both above and below, upon installation, as will be described in further detail below.

Indeed, as has been described previously herein, various embodiments of synthetic thatch elements 100, 200, 300, 400, and/or 500 incorporate textured surface portions on both their first and second sides (e.g., on both their top and bottom surfaces). That being said, in certain embodiments, the textured surface portions are configured in substantially the same manner (e.g., both regular versus irregular in form), while in other embodiments, the texture of the two opposing surfaces may be substantially different. As a non-limiting example, the first (e.g., top) surface of an element 100 may contain regular textured surface portions, while its opposing second (e.g., bottom) surface contains irregular (e.g., rippled) portions. Alternatively, the first surface may contain the irregularly textured surface portions, while the second (e.g., bottom) surface only contains regularly textured portions. Still other combinations and/or varieties of texturing may be envisioned, as within the general scope of the present invention.

Still further, it should be understood that various embodiments, in addition to varying the regularity of the textured surface portions, may further vary the number, size, and/or shape of the textured surface portions between the respective first and second (e.g., top and bottom) sides of the synthetic thatch elements 100, 200. Such may be beneficial, for example, where less texture underneath provides a sufficiently smooth surface for attaching the elements relative to one another and/or to a building roofing surface.

Arrays of Various Embodiments

In addition to the various embodiments of synthetic thatch elements 100, 200, 300, 400, and/or 500 disclosed and described herein, it should be understood that multiple elements 100, 200, 300, 400, and/or 500 may further be assembled into thatch element panels. In certain embodiments, these panels may be formed by at least one column of vertically overlapping elements 100, 200, 300, 400, and/or 500. In other embodiments, these panels may be formed by at least one row of horizontally overlapping elements 100, 200, 300, 400, and/or 500. In still other embodiments, the panels may be formed from a combination of overlapping rows and columns, including the non-limiting example of four-adjacently positioned elements 100, configured so as to form a substantially "square" panel. Of course, it should be understood that any of a variety of number and/or shape (e.g., conical or circular or otherwise) of panels may be formed by two or more adjacently positioned synthetic thatch elements 100, 200, 300, 400, and/or 500, as will be described in somewhat further detail below.

In various embodiments, the arrays of synthetic thatch elements 100, 200, 300, 400, and/or 500 may be configured to be removably attached to a roofing surface and/or panel, as previously described herein. In certain embodiments, the panel structure may be itself detachable from the roof surface (as will be described further below). However, in other embodiments, one or more of the elements 100, 200, 300, 400, and/or 500, whether individually or in a panelized subset, may be removably detachable from the overarching panel and/or roofing surface. In certain embodiments, such may be beneficial where one or more elements 100, 200, 300, 400, and/or 500 may be in need of repair or replacement, for whatever reason. It should be understood, of course, that the selectively attachable/detachable elements and/or panels may be configured in these and a variety of other embodiments to attach by any of a variety of attachment mechanisms, including the non-limiting examples of adhesives, clips, hooks, magnets, Velcro, and the like.

Method of Making and Using Various Embodiments

Various embodiments of synthetic thatch elements 100, 200, 300, 400, and/or 500 according to the present invention may be made via any method of polymer fabrication commonly known and used in the art. Non-limiting examples, which will be described in further detail below, include molding and extrusion processes.

Various embodiments of synthetic thatch elements 100, 200, 300, 400, and/or 500 may be formed by compression or injection molding processes. In compression molding, a polymer and any additives are placed into a mold, which is subsequently closed and maintained at a high pressure. In contrast, injection molding involves injecting the polymer in a molten state into a closed mold. The molten polymer may then be cooled and hardened into the shape defined within the mold. Once cooled and hardened, the resulting shaped synthetic thatch elements 100, 200, 300, 400, and/or 500 may be removed from the mold, if opened. It should be understood that any materials and methods used in compression and/or injection molding, which are commonly known and used in the art may be used to form the various embodiments of synthetic thatch elements 100, 200 as described herein.

Textured surface portions, as previously described herein, may be added to one or more surfaces of various embodiments of synthetic thatch elements 100, 200, 300, 400, and/or 500. In those embodiments involving an extrusion process, the texture may be produced by extruding the molten polymer through a die that has the shape of the texture cut into it. In other embodiments, namely those involving a compression or injection molding process, the textured surface portions may be more efficiently produced, for example, by building the regular and/or irregularly shaped texture surface portions into the mold itself. Notably, injection molding provides certain advantages in this regard, particularly in the context of forming irregularly shaped textured surface portions, as compared to the previously described extrusion processes.

Once formed, various methods of using and/or installing the various embodiments discussed above exist, as commonly known and understood in the art. For purposes of exemplary disclosure, a method of using and/or installing the synthetic thatch elements 100, 200, 300, 400, and/or 500 will now be discussed with reference to at least FIGS. 13-15, with reference where necessary to the remaining FIGS. 2-12C. It should be understood that this method provides a non-limiting example for purposes of disclosure and methods of making and using these embodiments, along with still other variants thereof, may involve certain modifications or additions to this particularly disclosed method.

According to this particular non-limiting method of using and/or installing the various embodiments of synthetic thatch elements 100, 200, 300, 400, and/or 500 on a building structure 600, begins, as illustrated in FIG. 13, by positioning successive elements (e.g., 100, 200, 300, 400, and/or 500) horizontally adjacent relative to one another (see elements A, B, C). In certain embodiments, the elements 100, 200 are further positioned such that at least a portion of each side of successive elements is overlapping. In at least one embodiment, the degree of overlap for an element approximately 22 inches in total width is approximately five (5) inches. In such embodiments, each successively installed element is placed at least in part atop a portion of a previously installed element. In this manner, the overlapping pattern of successive elements 100, 200, 300, 400, and/or 500, provide a substantially impermeable surface for roofing material, thereby keeping the environmental elements separate from space within a building or open structure beneath the roofing structure. Still further, the varying degrees of overlap may, at least in part, determine a degree of rigidity and thus strength of the installed arrangement, as may be necessary to satisfy certain criteria upon specific structures (e.g., strength sufficient to withstand hurricane force winds on a tiki but located in a tropical storm prone region).

Continuing with the exemplary method of using and/or installing the various embodiments of synthetic thatch elements 100, 200, 300, 400, and/or 500 on a building structure 600, as illustrated in at least FIG. 14, successive rows of the elements may likewise be positioned such that at least a portion of each element in a particular row (see element D and E) at least partially overlaps portions of elements (see elements A, B, C) positioned in an adjacent row. In certain embodiments, as generally known and understood in the art, substantially only the serrated portions 120, 220, 320, 420, and/or 520 of the elements 100, 200, 300, 400, and/or 500 would be positioned so as to overlap adjacently positioned elements, so as to maximize the square footage covered by respective impermeable fused portions 110, 210, 310, 410, and/or 510 of the elements. For example, the serrated portion 120 of an element in an upper row of elements may overlap and thus overlie at least a portion of the fused portion 110 of an element in a lower row, directly beneath the upper row. In this manner, the natural look of the plurality of frond members 112 remains consistent, while the fused portions 110 underneath also provide a comparable natural appearance, as compared, for example to the prior art element (10) of FIG. 1.

It should be understood, of course, that while the exemplary installation of successive rows on a building structure 600, has been described hereinabove, the respective elements 100, 200, 300, 400, and/or 500 may also be installed as successive columns (not illustrated), as may be desirable for particular applications. In still further embodiments, installation and use may be neither in column or row format, but diagonally or still otherwise (also not illustrated), as may be more beneficial and/or convenient for use on varying geometries of roofing structures. As a non-limiting example, installation on a circular tiki but may require irregular overlapping and installation techniques, beyond mere columns and rows, so as to ensure a natural and aesthetically pleasing appearance.

Likewise, while installation and use on a building structure 600 has been generally described with regard to overlapping of existing elements 100, 200, 300, 400, and/or 500, as have been generally described herein, it should further be understood that, during installation or use, a portion of the elements may be trimmed and/or removed from the remainder of the elements for a variety of considerations. As a non-limiting example, when reaching an edge of a roofing structure, it may be beneficial and/or desirable to trim the side edge of element 100, as shown in FIG. 15 so as to provide a flush, straight edge, as opposed to the flared fan that is illustrated. As should also be understood from FIG. 15, it may be beneficial to at least partially angle certain elements 100, 200, 300, 400, and/or 500 substantially adjacent corners of an associated structure, so as to facilitate obtaining a blended appearance upon complete installation. Of course such and still other modifications upon installation and/or use should be considered within the scope and intent of the various embodiments of the elements 100, 200, 300, 400, and/or 500, as described in great detail herein.

Still further, while various embodiments of synthetic thatch elements have been described herein as comprising an attachment portion (see e.g., portion 105), by which the fronds of the elements may be retained and/or the elements themselves may be affixed to a roofing structure, it should be understood that the elements may be selectively attachable and/or detachable from the roofing structure, as may be desirable for particular applications. Such selective attachment may be accomplished, as described previously herein, via any of a variety of adhesive or attachment mechanisms, as commonly known and understood in the art. That being said, in certain embodiments, it may be desirable to instead selectively attach and/or detach a pre-configured panel of such elements 100, 200, 300, 400, and/or 500, for any of a variety of considerations such as the non-limiting examples of repair, safety precautions due to inclement weather, and/or storage during period of non-use of certain structures. Of course, in still other embodiments, the selectively attachable or detachable panels containing any of a variety of number of elements 100, 200, 300, 400, and/or 500 may further be preassembled prior to transport to an installation site, as may also be desirable in particular applications.

Conclusion

Indeed, many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to any of the specific embodiments and/or examples disclosed and that modifications, variations, and other embodiments are intended to be included within the scope of the appended claims. Still further, although specific terms are employed herein, they are used in a generic and descriptive sense only and not for purposes of limitation.

That which is claimed:

1. A synthetic thatch member for use as a roofing material product, said synthetic thatch member comprising:
   a plurality of frond members, said frond members defining a first three-dimensional surface of said thatch member and a second three-dimensional surface of said thatch member, said first and second surfaces comprising opposing sides of said plurality of frond members;
   a fused portion, said fused portion comprising a first portion of said first and said second three-dimensional surfaces of each of said plurality of frond members, wherein each of said first portions is connected relative to one another, such that said fused portion defines a substantially impermeable surface; and
   a serrated portion, said serrated portion being located substantially adjacent said fused portion and comprising a second portion of said first and said second three-dimensional surfaces of each of said plurality of frond members, wherein each of said second portions is separated relative to one another, such that a plurality of gaps are defined between each of said second portions of each of said plurality of frond members.

2. The synthetic thatch member of claim 1, wherein each of the plurality of frond members comprises a pair of angled surfaces, said pair of angled surfaces being oriented relative to one another so as to further define both said first and said second portions of said first and said second three-dimensional surfaces of said thatch member.

3. The synthetic thatch member of claim 2, wherein:
   said pair of angled surfaces define a ridge portion on each of said plurality of frond members;
   said pair of angled surfaces define at least one valley portion adjacent at least one edge of each of said plurality of frond members;
   in said fused portion, said at least one valley portion is configured to, at least in part, define said substantially impermeable surface; and
   in said serrated portion, said at least one valley portion is configured to, at least in part, define said plurality of gaps.

4. The synthetic thatch member of claim 1, wherein a length of said synthetic thatch member is approximately thirty-two inches.

5. The synthetic thatch member of claim 4, wherein:
   said length is defined by a length of said fused portion and a length of said serrated portion;
   said length of said fused portion is approximately twenty-one inches; and
   said length of said serrated portion is approximately eleven inches.

6. The synthetic thatch member of claim 1, wherein a length of said synthetic thatch member is variable across each of said plurality of frond members, such that a substantially fan-shaped arc is defined at least in part by said second portions of each of said plurality of frond members in said serrated portion.

7. The synthetic thatch member of claim 1, wherein a length of said synthetic thatch member is substantially fixed across each of said plurality of frond members, such that a substantially linear edge of said synthetic thatch member is defined at least in part by said second portions of each of said plurality of frond members in said serrated portion.

8. The synthetic thatch member of claim 1, wherein a maximum width of said synthetic thatch member is approximately twenty-two inches.

9. The synthetic thatch member of claim 8, wherein said maximum width occurs substantially within said fused portion, such that said serrated portion is substantially the same width as said maximum width.

10. The synthetic thatch member of claim 8, wherein said maximum width occurs substantially within said serrated portion, such that a width of said fused portion is substantially less than said maximum width.

11. The synthetic thatch member of claim 1, wherein a width of each of said plurality of frond members is approximately one inch.

12. The synthetic thatch member of claim 11, wherein said width is variable so as to define a taper between said first and said second portions of each of said plurality of frond members, such that said width in said second portion is substantially less than said width in said first portion.

13. The synthetic thatch member of claim 12, wherein each of said tapers on each of said plurality of frond members define, at least in part, each of said plurality of gaps between each of said second portions of each of said plurality of frond members.

14. The synthetic thatch member of claim 13, wherein each of said plurality of gaps has an average width of approximately ½ inch.

15. The synthetic thatch member of claim 1, wherein a thickness of each of said plurality of frond members is approximately 1/16 of an inch, said thickness being defined at least in part by said first and said second three-dimensional surfaces of each of said plurality of frond members.

16. The synthetic thatch member of claim 15, wherein said thickness is variable so as to define a taper between said first and said second portions of each of said plurality of frond members, such that said thickness in said second portion is substantially less than said width in said first portion.

17. The synthetic thatch member of claim 1, wherein said first and said second three-dimensional surfaces of said thatch member comprise a texture imprinted thereon.

18. The synthetic thatch member of claim 17, wherein said texture comprises a plurality of irregularities formed in one or more of each of said plurality of frond members.

19. The synthetic thatch member of claim 1, wherein said member further comprises an attachment portion, said attachment portion being configured to selectively secure proximate portions of each of said plurality of frond members, said proximate portions being substantially opposite said portions of each of said plurality of frond members defining said serrated portion.

20. The synthetic thatch member of claim 1, wherein said fused portion covers a surface area of approximately one square foot.

21. A method of installation of a synthetic thatch member for use as a roofing material product, said method of installation comprising the steps of:
   (A) providing a plurality of synthetic thatch members, each member comprising:
      (i) a plurality of frond members, said frond members defining a first three-dimensional surface of said thatch member and a second three-dimensional surface of said thatch member, said first and second surfaces comprising opposing sides of said plurality of frond members;
      (ii) a fused portion, said fused portion comprising a first portion of said first and said second three-dimensional surfaces of each of said plurality of frond members, wherein each of said first portions is connected relative to one another, such that said fused portion defines a substantially impermeable surface; and
      (iii) a serrated portion, said serrated portion being located substantially adjacent said fused portion and comprising a second portion of said first and said second three-dimensional surfaces of each of said plurality of frond members, wherein each of said second portions is separated relative to one another, such that a plurality of gaps are defined between each of said second portions of each of said plurality of frond members;

(B) affixing a first one of said plurality of synthetic thatch members to an adjacently positioned portion of a roofing structure, such that said serrated portion is oriented substantially below said fused portion; and (C) affixing a second one of said plurality of synthetic thatch members to an adjacently positioned portion of said roofing structure, such that said first and second ones of said plurality of synthetic thatch members are both positioned substantially along the same horizontal plane, and such that at least a portion of said fused portion of said second one of said plurality of synthetic thatch members at least partially overlaps at least a portion of said fused portion of said first one of said plurality of synthetic thatch members.

22. The method of claim 21, wherein at least a portion of said fused portion of said second one of said plurality of synthetic thatch members overlaps at least a portion of said fused portion of said first one of said plurality of synthetic thatch members by a distance of approximately five inches.

23. The method of claim 21, further comprising the step of affixing a third one of said plurality of synthetic thatch members to an adjacently positioned portion of said roofing structure, such that at least a portion of said fused portion of said third one of said plurality of synthetic thatch members is positioned substantially above said first and said second ones of said plurality of synthetic thatch members, such that at least a portion of said fused portion of said third one of said plurality of synthetic thatch members at least partially overlaps both (i) at least a portion of said fused portion of said first one of said plurality of synthetic thatch members; and (ii) at least a portion of said fused portion of said second one of said plurality of synthetic thatch members.

24. The method of claim 23, wherein at least a portion of said serrated portion of said third one of said plurality of synthetic thatch members at least partially overlaps at least a portion of said serrated portions of said first and second ones of said plurality of synthetic thatch members.

25. The method of claim 24, wherein said degree of partial overlap is a distance of approximately five inches.

26. A method of manufacturing a synthetic thatch member for use as a roofing material product, the thatch member comprising a plurality of frond members, the method comprising the steps of:
   placing a molten polymer material into a mold; and
   forming said synthetic thatch member from said molten polymer material, said synthetic thatch member comprising:
      (i) a plurality of frond members, said frond members defining a first three-dimensional surface of said thatch member and a second three-dimensional surface of said thatch member, said first and second surfaces comprising opposing sides of said plurality of frond members;
      (ii) a fused portion, said fused portion comprising a first portion of said first and said second three-dimensional surfaces of each of said plurality of frond members, wherein each of said first portions is connected relative to one another, such that said fused portion defines a substantially impermeable surface; and
      (iii) a serrated portion, said serrated portion being located substantially adjacent said fused portion and comprising a second portion of said first and said second three-dimensional surfaces of each of said plurality of frond members, wherein each of said second portions is separated relative to one another, such that a plurality of gaps are defined between each of said second portions of each of said plurality of frond members;
   wherein said mold defines said structural configuration of at least said plurality of frond members, said fused portion, and said serrated portion.

27. The method of claim 26, wherein:
   the step of forming the synthetic thatch member comprises an injection molding process; and
   said mold further comprises one or more textured surface portions thereon, said one or more textured surface portions being configured to impart a texture to one or more portions of said fused and serrated portions.

28. The method of claim 27, wherein:
   the step of forming the synthetic thatch member comprises an extrusion process; and
   one or more textured surface portions are imprinted upon at least a portion of said fused and said serrated portions by extruding the molten polymer further through a die having the desired texture formed therein.

* * * * *